(12) United States Patent
Yamamoto

(10) Patent No.: US 10,447,798 B2
(45) Date of Patent: Oct. 15, 2019

(54) COMMUNICATION SYSTEM PERMITTING REDUCTION OF AMOUNT OF DATA OF ROUTE INFORMATION INCLUDED IN PACKET, COMMUNICATION METHOD, AND RELAY DEVICE OF COMMUNICATION SYSTEM

(71) Applicant: FUJITSU LIMITED, Kawasaki-shi, Kanagawa (JP)

(72) Inventor: Tetsu Yamamoto, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 310 days.

(21) Appl. No.: 15/232,249

(22) Filed: Aug. 9, 2016

(65) Prior Publication Data
US 2016/0352852 A1 Dec. 1, 2016

Related U.S. Application Data

(63) Continuation of application No. PCT/JP2014/059514, filed on Mar. 31, 2014.

(51) Int. Cl.
*H04L 29/08* (2006.01)
*H04L 12/64* (2006.01)
(Continued)

(52) U.S. Cl.
CPC ...... *H04L 67/2823* (2013.01); *H04L 12/6418* (2013.01); *H04L 45/04* (2013.01);
(Continued)

(58) Field of Classification Search
CPC .. H04L 67/2823; H04L 12/6418; H04L 12/66
See application file for complete search history.

(56) References Cited

U.S. PATENT DOCUMENTS 5,781,534 A * 7/1998 Perlman .................. H04L 45/26
370/248
6,131,124 A 10/2000 Nakatsugawa
(Continued)

FOREIGN PATENT DOCUMENTS

JP 10-243011 A 9/1998
JP 11-341060 A 12/1999
(Continued)

OTHER PUBLICATIONS

International Search Report dated Jul. 1, 2014, issued in counterpart application No. PCT/JP2014/059514 (1 page).

*Primary Examiner* — Ricky Q Ngo
*Assistant Examiner* — Stephen N Steiner
(74) *Attorney, Agent, or Firm* — Westerman, Hattori, Daniels & Adrian, LLP

(57) ABSTRACT

A communication system includes an information processing device and a relay device. The relay device stores information identifying a transfer destination device that is a transfer destination of a packet that includes data destined for the information processing device, and relays communication between a first network that includes the transfer destination device and a second network. When the relay device receives, from a transmission source in the second network, a first data packet that includes the data destined for the information processing device, the relay device generates a device index value that is used when the relay device determines the transmission source from among devices included in the second network. The relay device transmits, to the transfer destination device, a second data packet obtained by adding, to the first data packet, the device index value and a network index value that identifies the second network.

15 Claims, 18 Drawing Sheets

(51) Int. Cl.
*H04L 12/741* (2013.01)
*H04L 12/715* (2013.01)
*H04L 12/66* (2006.01)

(52) U.S. Cl.
CPC .............. *H04L 45/74* (2013.01); *H04L 67/12* (2013.01); *H04L 12/66* (2013.01)

(56) References Cited

U.S. PATENT DOCUMENTS

| | | | |
|---|---|---|---|
| 6,437,692 B1* | 8/2002 | Petite | G01D 4/004 340/540 |
| 2006/0190458 A1* | 8/2006 | Mishina | H04L 67/125 |
| 2009/0296724 A1* | 12/2009 | Matsunaga | H04L 12/2818 370/401 |
| 2011/0051652 A1 | 3/2011 | Kubo et al. | |
| 2014/0369179 A1 | 12/2014 | Ueda et al. | |
| 2017/0295535 A1* | 10/2017 | Sherman | H04W 76/10 |

FOREIGN PATENT DOCUMENTS

| | | |
|---|---|---|
| JP | 2011-4096 A | 1/2011 |
| JP | 2011-55077 A | 3/2011 |
| JP | 2013-157752 A | 8/2013 |

\* cited by examiner

FIG. 7

Table 61_1:

| INDEX | ASSOCIATED AREA APPLICATION PROCESSING UNIT | POINTER |
|---|---|---|
| 0 | | |
| 1 | NE3 | Po1 |
| DEFAULT | NE3 | Po1 |

Table 61_5:

| INDEX | ASSOCIATED AREA APPLICATION PROCESSING UNIT | POINTER |
|---|---|---|
| 0 | NE2 | Po2 |
| 1 | NE3 | Po3 |
| 2 | NE2 | Po2 |
| DEFAULT | | |

Table 62_1:

| POINTER | NETWORK | INDEX | TRANSFER DESTINATION |
|---|---|---|---|
| Po1 | NE3 | DEFAULT | N5 |

Table 62a_5:

| POINTER | NETWORK | INDEX | TRANSFER DESTINATION |
|---|---|---|---|
| Po3 | NE3 | DEFAULT | N5 |

Table 62b_5:

| POINTER | NETWORK | INDEX | TRANSFER DESTINATION |
|---|---|---|---|
| Po2 | NE2 | DEFAULT | N9 |

| INDEX | ASSOCIATED AREA | POINTER |
|---|---|---|
| 0 | APPLICATION PROCESSING UNIT | |
| 1 | NE1 | Po4 |
| 2 | NE2 | Po5 |
| DEFAULT | NE1 | Po4 |

62a_9

| POINTER | NETWORK | INDEX | TRANSFER DESTINATION |
|---|---|---|---|
| Po5 | NE2 | 0 | N4 |
| | | DEFAULT | N9 |

62b_9

| POINTER | NETWORK | INDEX | TRANSFER DESTINATION |
|---|---|---|---|
| Po4 | NE1 | DEFAULT | N10 |

62c_9

| POINTER | NETWORK | INDEX | TRANSFER DESTINATION |
|---|---|---|---|
| Po5 | NE2 | 0 | N4 |
| | | 1 | N5 |
| | | DEFAULT | N9 |

| INDEX | ASSOCIATED AREA | POINTER |
|---|---|---|
| 0 | APPLICATION PROCESSING UNIT | |
| 1 | NE1 | Po6 |
| DEFAULT | APPLICATION PROCESSING UNIT | |

62_10a

| POINTER | NETWORK | INDEX | TRANSFER DESTINATION |
|---|---|---|---|
| Po6 | NE1 | 0 | N7 |
| | | 1 | N8 |
| | | DEFAULT | N10 |

62_10b

| POINTER | NETWORK | INDEX | TRANSFER DESTINATION |
|---|---|---|---|
| Po6 | NE1 | 0 | N7 |
| | | 1 | N8 |
| | | 2 | N9 |
| | | DEFAULT | N10 |

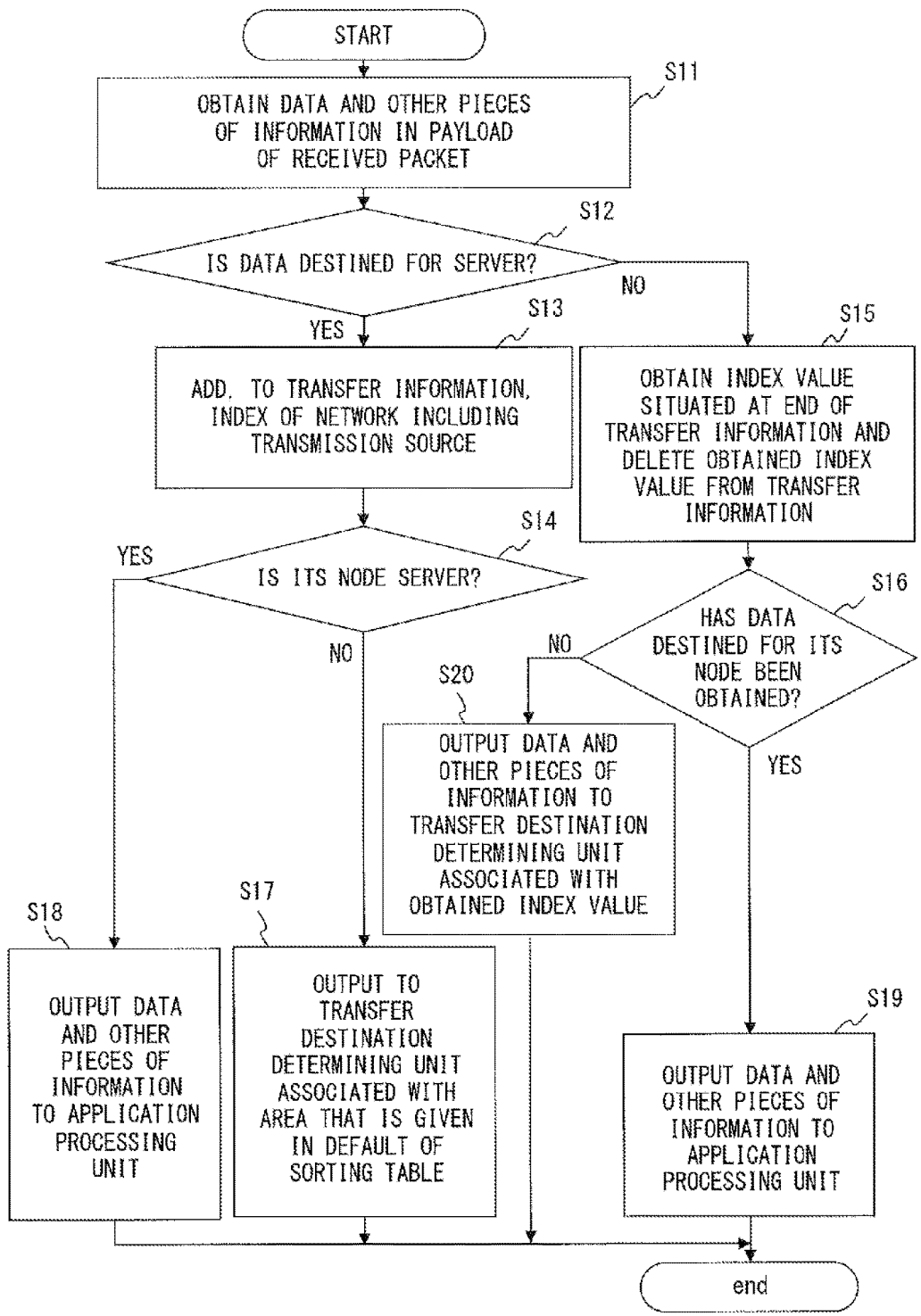
F I G. 1 4

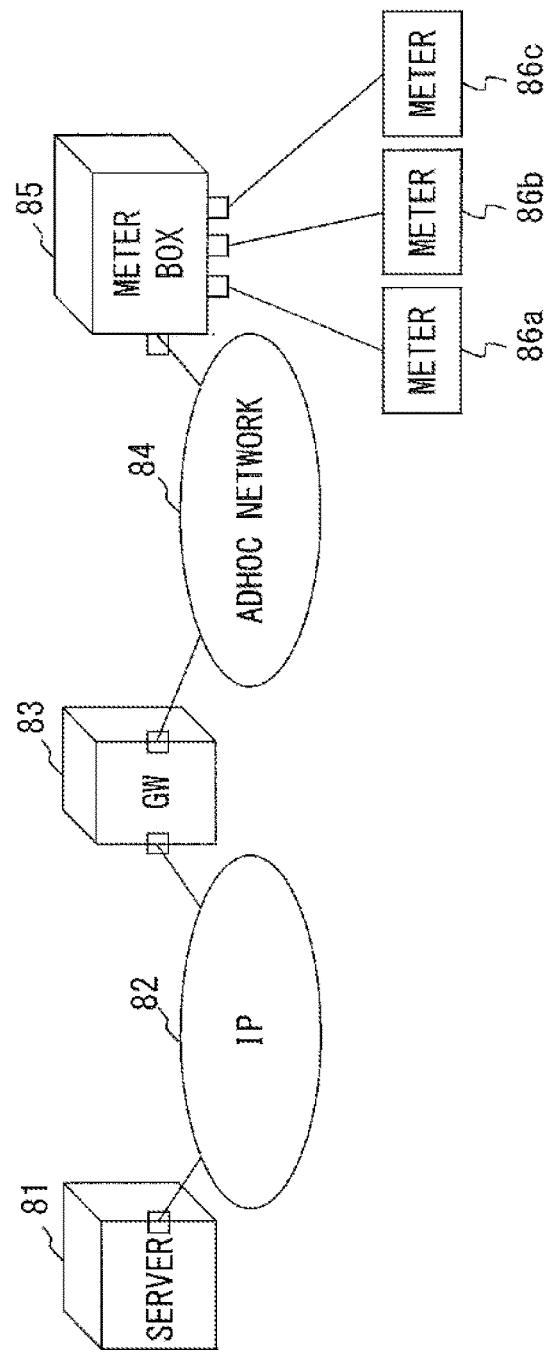
F I G. 16

COMMUNICATION SYSTEM PERMITTING REDUCTION OF AMOUNT OF DATA OF ROUTE INFORMATION INCLUDED IN PACKET, COMMUNICATION METHOD, AND RELAY DEVICE OF COMMUNICATION SYSTEM

CROSS-REFERENCE TO RELATED APPLICATION

This application is a continuation application or International Application PCT/JP2014/059514 filed on Mar. 31, 2014 and designated the U.S., the entire contents of which are incorporated herein by reference.

FIELD

The embodiments discussed herein are related to a communication system.

BACKGROUND

In a system that includes a plurality of networks, protocols used in the networks may be different from one another. A sensor network system illustrated in FIG. 1 includes a network of a communication device (a sensor node) that is provided with a sensor, and a network having a server that processes data obtained from the sensor. In the example of FIG. 1, a routing protocol for an ad hoc network is used in the sensor network, and an Internet protocol (IP) is used in the network including the server. When the sensor node of FIG. 1 transmits a packet to the server, the sensor node generates a packet destined for a gateway (GW) using the routing protocol for an ad hoc network. A payload of the packet generated by the sensor node includes data destined for the server and information indicating that the final destination is the server. The gateway reads the payload of the received packet, and then recognizes that the final destination is the server in the IP network. Then, the gateway generates a packet having a payload that includes the data destined for the server, and transmits the generated packet to the server using the IP protocol. If the changed packet is transmitted from the gateway, the server receives the data transmitted from the sensor node. In this case, a setting is performed in an application that is included in the sensor node, such that the gateway is designated to be a destination of the data destined for the server. Conversely, when data is transmitted from the server to the sensor node, a setting is also performed in an application of the server, such that, the gateway is designated to be a destination of the data destined for the sensor node. Further, the gateway analyzes data so as to determine whether the destination of the data is a device other than the gateway. Thus, when an application that is to be used in the system of FIG. 1 is developed, different settings are performed in the sensor node, the gateway, and the server, respectively. In the example of FIG. 1, the ad hoc network and the IP network are connected to each other through the gateway, but there may be any number of networks included in a transmission route of a packet.

Therefore, a system has been proposed in which a transmission device includes, in a transmission packet, route information that includes addresses of all nodes through which the transmission packet passes until it arrives at a destination node from a node of the transmission device, and each relay device transfers the transmission packet while identifying a transmission destination using the route information. Further, as a related technology, a wireless communication device has also been proposed that stores, in the form of a history, a destination of a packet that was transmitted in the past, or a transmission source that transmitted relay route information, the destination and the transmission source being included in a network in which a multi-hop communication is performed. When there exists a transmission history with respect to a destination of a packet to be transmitted, using the destination of the packet and the history, the wireless communication device adds, to the packet, information indicating that relay processing is to be performed, so as to perform relay processing using the destination of a packet and the history.

For example, some documents such as Japanese Laid-open Patent Publication No. 2013-157752 and Japanese Laid-open Patent Publication No. 2011-055077 are know.

In a system in which a certain device that will transmit a packet to another device in another network includes, in a packet, an address of a device included in a route to a final destination, and the certain device transmits the packet, if the number of nodes through which the packet passes is larger, an amount of route information is larger. Thus, depending on the length of a route, an amount of data that can be transmitted by one packet is restricted. Further, in a method that uses a transmission history, a transmission history created by transfer processing performed in the same network is used, so the method is not suitable for relay processing performed between networks of different protocols.

SUMMARY

According to an aspect of the embodiments, a communication system includes an information processing device and a relay device. The relay device stores information identifying a transfer destination device that is a transfer destination of a packet that includes data destined for the information processing device, and relays communication between a first network that includes the transfer destination device and a second network. When the relay device receives, from a transmission source in the second network, a first data packet that includes the data destined for the information processing device, the relay device generates a device index value that is used when the relay device determines the transmission source from among devices included in the second network. The relay device transmits, to the transfer destination device, a second data packet obtained by adding, to the first data packet, the device index value and a network index value that identifies the second network.

The object and advantages of the invention will be realized and attained by means of the elements and combinations particularly pointed out in the claims.

It is to be understood that both the foregoing general description and the following detailed description are exemplary, and explanatory and are not restrictive of the invention.

BRIEF INSCRIPTION OF DRAWINGS

FIG. 1 illustrates an example of a sensor network system;
FIG. 2 illustrates an example of a communication system according to an embodiment;
FIG. 3 illustrates an example of a configuration of a relay device;
FIG. 4 illustrates an example of a hardware configuration;
FIG. 5 illustrates an example of a packet, format;
FIG. 6 illustrates an example of a sorting table;

FIG. 7 illustrates an example of correspondence between a transfer destination table and the sorting table;

FIG. 9 is a diagram for explaining an example of a method for updating the transfer destination table;

FIG. 10 is a diagram for explaining an example of a method for updating the transfer destination table;

FIG. 14 is a flowchart that illustrates an example of processing performed in a dispatcher;

FIG. 16 illustrates a specific example of a system that uses three different protocols;

DESCRIPTION OF EMBODIMENTS

Figure 1:
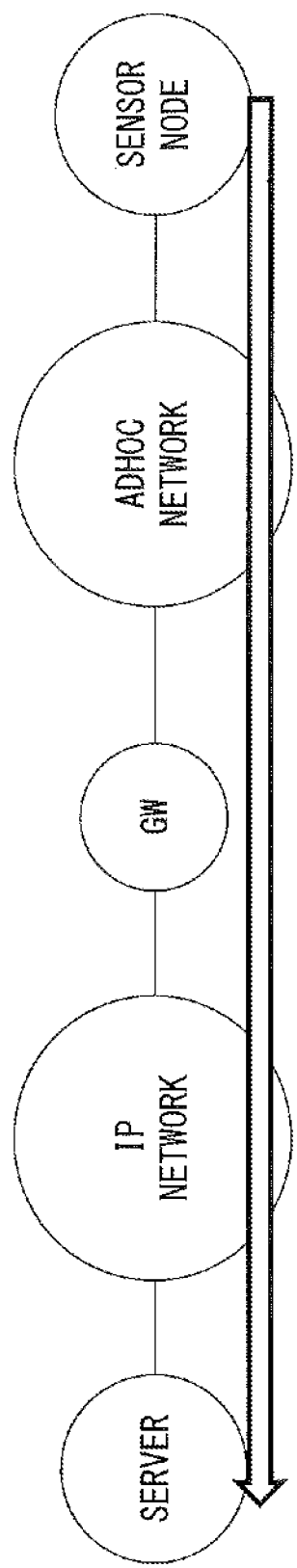
Figure 2:
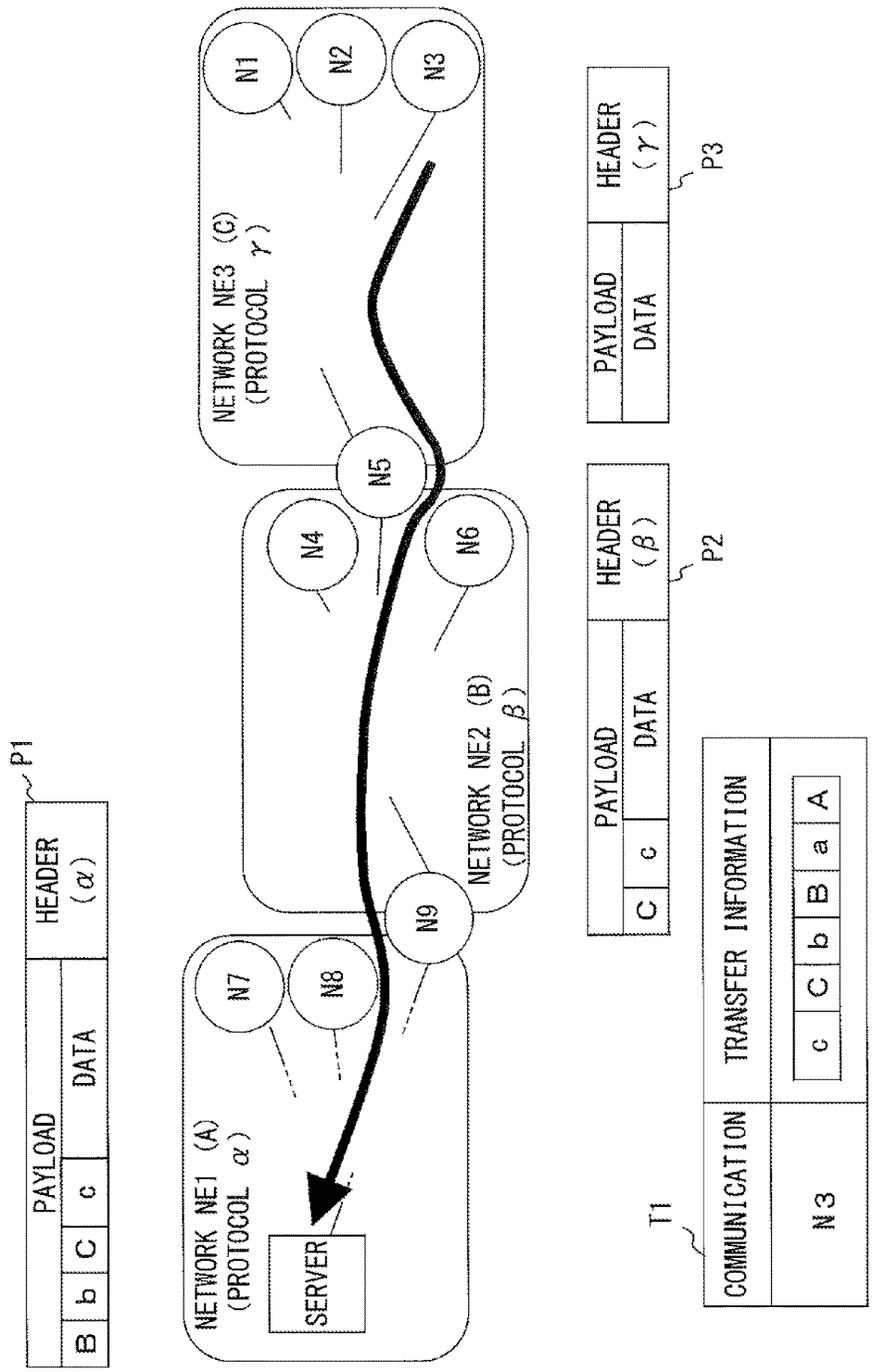

FIG. 2 illustrates an example of a communication system according to an embodiment. In the example of FIG. 2, a system includes three networks, a network NE1, a network NE2, and a network NE3. In the example of FIG. 2, it is assumed that an index value of the network NE1 is A, an index value of the network NE2 is B, and an index value of the network NE3 is C. An index assigned to a network may hereinafter be referred to as a "network index value". The network index value is set so as to be represented by fewer bits than those of an identifier of the network. Protocols used in the network NE1, the network NE2, and the network NE3 are different from one another. In the following descriptions, it is assumed that a protocol α is used in the network NE1, a protocol β is used in the network NE2, and a protocol γ is used in the network NE3. It is also assumed that the network NE1 includes a server (an information processing device).

FIG. 2 illustrates some of the communication devices that are included in each network, and an identifier used to uniquely identify each communication device is given to the communication device. For example, an address is used as an identifier. In FIG. 2, in order to facilitate understanding, a combination of a letter and a number is used to represent an identifier of a communication device. Further, in order to facilitate reading, a string called "node" is given in front of an identifier when the identifier refers to a device itself to which the identifier is assigned. For example, "N9" refers to an identifier N9, and a "node N9" is a communication device to which the identifier "N9" is assigned.

A communication device, in the system belongs to one or more networks. From among communication networks, a device that relays between networks in which different protocols are used may be referred to as a relay device. For example, a node N9 belongs to both the network NE1 and the network NE2, and operates as a gateway between the network NE1 and the network NE2, so it is a relay device. Likewise, a node N5 belongs to both the network NE2 and the network NE3, so it operates as a gateway between the network NE2 and the network NE3.

A communication device (a relay device) that operates as a gateway holds information identifying a device that is a transfer destination of a packet including data destined for a server (a transfer destination device). In the example of FIG. 2, a transfer destination device for the node N5 is the node N9, and a transfer destination device for the node N3 is the server. Each communication device except for a relay device transmits information destined for the server to a relay device that belongs to the same network. As an example, a case in which a node N3 transmits a packet destined for the server is described below.

In Procedure a1, the node N3 transmits a packet destined for the server to the node N5 because they belong to the network NE3. An example of the packet transmitted by the node N3 to the node N5 is represented by a packet P3. The packet P3 includes a header for which the protocol γ is used and a payload. It is assumed that the payload includes information indicating that a communication device that generated data is the node N3 and the packet P3 is a packet destined for the server.

In Procedure a2, when it receives the packet P3 destined for the server, the node N5 determines, from information in the payload, that data destined for the server is included. Then, the node N5 assigns, to the node N3 that is a transmission source of the packet P3, an index value that is to be used by the node N5 to identify the node N3 from among devices in the network NE3. The index value that is assigned by a relay device to a transmission source of a packet destined for the server may hereinafter be referred to as a "device index value". It is assumed that the device index value is represented by fewer bits than those of an address assigned to a transmission-source communication device because the device index value is assigned such that the transmission-source communication device can be identified in a network to which the communication device belongs. In the example of FIG. 2, it is assumed that the node N5 assigns a device index value "c" to the node N3.

In Procedure a3, the node N5 includes, in the payload included in the packet P3, the device index value "c" of the node N3 that is a transmission source of the packet P3, and the network index value C of the network NE3. Further, the node N5 adds, to the payload, a header for transferring a packet to the node N3 that is a transfer destination device for the node N5, so as to generate a packet P2. The node N5 transmits the packet P2 to the node N9.

In Procedure a4, when it receives the packet P2, the node NS determines, from information in the payload, that data destined for the server is included. For the node N3, from among devices included in the network NE2, the device that transmitted the packet destined for the server to the node N9 is the node N5. Thus, the node MS assigns a device index value to the node N5 by processing similar to the processing described in Procedure a2. The device index value assigned to the node N5 is hereinafter referred to as "b".

In Procedure a5, the node N3 includes, in the payload included in the packet P2, the device index value "b" of the node N5 that is a transmission source of the packet P2, and the network index value B of the network NE2. The transfer destination device for the node N9 is the server, so the node N9 adds, to the processed payload, a header for transferring a packet to the server, so as to generate a packet P1. The node N9 transmits the packet P1 to the server.

Likewise, in Procedure a6, when it receives the packet P1, the server assigns a device index value to the node N9 in the network NE1. In the example of FIG. 2, is assumed that the device index value of the node N9 is "a". The server stores, as information used to perform a transfer when transmitting a packet to a communication device that generated data in the packet, a combination of an index value in the payload of the received packet and information used to determine a relay device that transmitted the packet, to the server (transfer information). In the example of FIG. 2, the server stores, as transfer information when transmitting a packet, to the node N3, a combination of an index value in the payload of the packet P1, the device index value "a" of the node N9, and the network index value A of the network NE1. As illustrated in a table T1, the transfer information is stored in association with an identifier of a communication device that is a destination of a packet from the server. The identifier of a communication device is information included by the communication device in the payload in Procedure a1. In the example of FIG. 2, six pieces of information c, C, b, B, a, A, in that, order from the head, are included as transfer information used to transfer a packet destined for the node N3.

Next, a method for using transfer information is described in Procedure a7. When it transmits a packet to the node N3, the server can determine the destination of the packet, using transfer information held in the table T1. For example, the server can determine the node N9 to be a transfer destination of a packet, that includes data destined for the node N3 using two pieces of information situated at the end of the transfer information, a and A. Further, if the server includes, in the payload, the transfer information along with the data destined for the node N3 and deletes a combination of the index values that were used by the server itself, a packet that includes c, C, b, B is transmitted to the node N9 as transfer information. The node N9 obtains device index value=b and the network index value B from the end of the transfer information in the payload, so the node N9 can determine the node N5 to be a transfer destination of the packet. Thus, the node N9 deletes, from the payload, the index values that were used by the node N9, and then it transfers a packet to the node N5 using a header corresponding to the protocol β. The transfer information in the received packet is device index value=c and the network index value C, so the node N5 determines the node N3 to be a transfer destination of the packet. The node N5 adds, to the payload from which the index values that were used by the node N5 have been deleted, a header corresponding to the protocol γ, and transmits the packet to the node N3.

As described above, a relay device makes it possible to determine a transmission source of data included in a packet using an index value used to identify the transmission source in a network to which the relay device itself belongs. Further, the number of bits used to represent a device index value or a network index value is less than the number of bits used to describe an address of, for example, a relay device. For this reason, even when the number of transfers is increased, transfer information is less likely to be made larger, compared to when the transfer destination is designated using an address, and therefore there is no possibility of restricting an amount of data that can be included in a packet. Thus, in the system according to the embodiment, it is possible to transmit and receive data efficiently even when communication is performed between networks of different protocols. If, in at least one of the networks, a device index value is set for a device included in the network, the number of bits used to report information about a route is made smaller, compared to when addresses of all relay devices on the route are designated. Thus, a device index value may be the same as the value of an address of a relay device in some of the networks on the route, according to an amount of memory provided in the relay device or a processing capacity of the relay device. In a network in which a device index value is set to the same value as that of an address of the device, information that associates the device index value with the address of the device is not created, so less memory needs to foe provided in a relay device.

Further, in this system, a transfer destination network is reported from a device at a server side, so each relay device can manage, for each network, information on a protocol used for transfer processing. In other words, a relay device does not store a protocol used for transfer processing and a transfer destination for each transfer destination, so a smaller amount of information needs to be held by the relay device when transfer processing is performed. The communication system according to the embodiment is also applicable when protocols of adjacent networks are not different from each other.

<Device Configuration>

Figure 3:
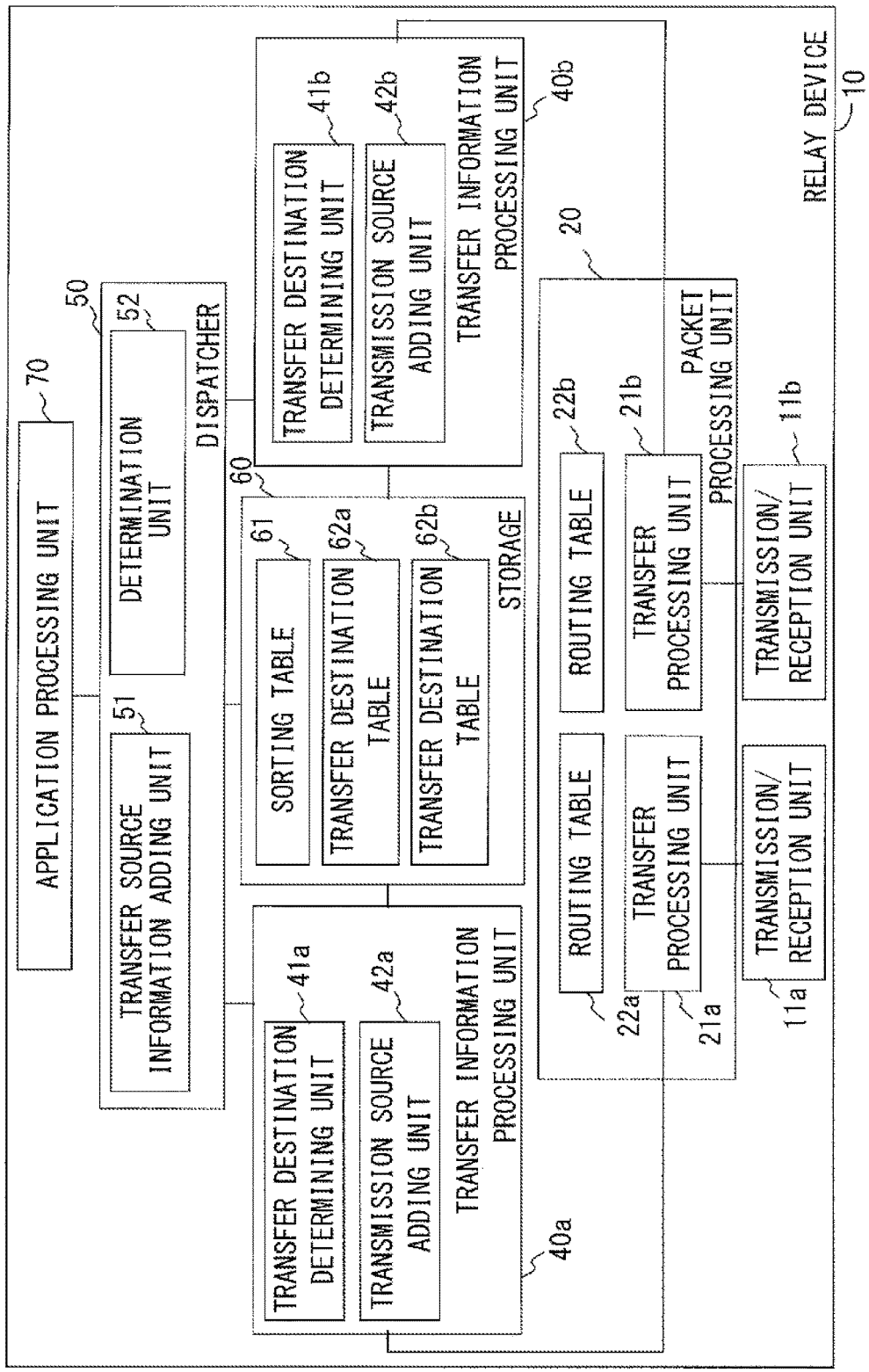

FIG. 3 illustrates an example of a configuration of a relay device 10. In the example of FIG. 3, a case in which the relay device 10 that, relays two networks of different protocols is illustrated, but the relay device 10 can relay any number of networks.

The relay device 10 includes transmission/reception units 11 (11a, 11b), a packet processing unit 20, transfer information processing units 40 (40a, 40b), a dispatcher 50, a storage 60, and an application processing unit 70. The packet processing unit 20 has transfer processing units 21 (21a, 21b) and routing tables 22 (22a, 22b). The transfer information processing unit 40 has a transfer destination determining unit 41 and a transmission source adding unit 42. The dispatcher 50 has a transfer source information adding unit 51 and a determination unit 52. The storage 60 includes a sorting table 61 and transfer destination tables 62 (62a, 62b).

The transmission/reception unit 11 performs Transmission/reception of a packet between other communication devices and the relay device 10. In this case a network to which a device to/from which the transmission/reception unit 11a transmits/receives a packet belongs is different from a network to which a device to/from which the transmission/reception unit 11b transmits/receives a packet belongs. In the following descriptions, the network including a device with which the relay device 10 communicates through the transmission/reception unit 11a is a network A, and a network including a device with which the relay device 10 communicates through the transmission/reception unit 11b is a network B. The transmission/reception unit 11a outputs, to the transfer processing unit 21a, a packet received from a device in the network A, and transmits, to another device, a packet input from the transfer processing unit 21a. Likewise, the transmission/reception unit lib outputs, to the transfer processing unit 21b, a packet received from a device in the networks, and transmits, to another device, a packet input from the transfer processing unit 21b.

The transfer processing unit 21a outputs, to a transmission source adding unit 42a, a payload in a packet input from the transmission/reception unit 11a and a transmission source address in a header. In the following descriptions, the header refers to a header of a network layer. Further, the transfer processing unit 21a determines a transfer destination of a packet including data input from a transfer destination determining unit 41a using the routing table 22a. The routing table 22a holds route information on a device that is included in the network A. The transfer processing unit 21b also performs processing similar to that of the transfer processing unit 21a with respect to the transmission/reception unit 11b, a transfer destination determining unit 41b, and a transmission source adding unit 42b. The routing table 22b includes information about a route to a device in the network B, and is used when transfer processing is performed in the transfer processing unit 21b.

The transmission source adding unit 42a determines whether data destined for a server is included in the input payload. When the data destined for the server is included, the transmission source adding unit 42a obtains, from a transfer destination table 62a, an index value corresponding to the address of a device reported from the transfer processing unit 21a. In this case, the transfer destination table 62a is a table in which an address of a device included in the network A is uniquely associated with an index value, and is used to determine a transfer destination of a packet transmitted from the server. A specific example of the transfer destination table 62 will be described later.

When it obtains an index value from the transfer destination table 62a, the transmission source adding unit 42a adds the obtained index value to the end of transfer information. On the other hand, when the transfer destination table 62a does not include an index value corresponding to the device reported from the transfer processing unit 21a, the transmission source adding unit 42a determines an index value corresponding to the reported device and adds the determined value to the end of the transfer information. Then, the transmission source adding unit 42a associates the determined index value with the address of the device reported from the transfer processing unit 21a, and registers them in the transfer destination table 62a. When the processing of addition to the transfer information is terminated, the transmission source adding unit 42a outputs, to the transfer source information adding unit 51, the processed transfer information along with the data. On the other hand, when the packet has been transmitted from the server, the transmission source adding unit 42a does not change the transfer information and outputs the data and the transfer information to the determination unit 52.

Processing that is performed when data is input from the transfer processing unit 21b to the transfer information processing unit 40b is similar to the processing that is performed when data is input from the transfer processing unit 21a to the transfer information processing unit 40a.

The transfer source information adding unit 51 adds, to transfer information added to data, in a packet destined for the server, an index value of a network from which the packet is transferred. For example, the transfer source information adding unit 51 adds, to the end of the transfer information associated with the data input from the transmission source adding unit 42a, an index value associated with a network (the network A) to which the transmission/reception unit 11a belongs. When it performs addition to the transfer information, the transfer source information adding unit 51 determines an output destination of the data and the transfer information using the sorting table 61. A specific example of the sorting table 61 and processing performed by the transfer source information adding unit 51 will be described later. The transfer source information adding unit 51 selects, as an output destination of the data, one of the transfer destination determining unit 41 (41a, 41b) and the application processing unit 70, and outputs the data along with the transfer information to the selected output destination.

The determination unit 52 extracts a network index value from the end of the transfer information associated with the input data. The determination unit 52 determines an output destination of the data and the transfer information using the obtained network index value. When the output destination of the data is determined, the determination unit 52 deletes, from the transfer information, the network index value that the determination unit 52 itself used to refer to the sorting table 61. The determination unit 52 outputs, to a selected transfer destination determining unit 41, the transfer information from which the network index value has been deleted, along with the data.

When the data and the transfer information are input from the transfer source information adding unit 51, the transfer destination determining unit 41b refers to the transfer destination table 62b, so as to determine a destination of the input data and transfer information. The transfer destination determining unit 41b outputs, to the transfer processing unit 21b, the data and transfer information input from the transfer source information adding unit 51, along with an address of the determined destination. On the other hand, when the data and the transfer information are input, from the determination unit 52, the transfer destination determining unit 41b searches in the transfer destination table 62b using, as a key, a device index value situated at the end of the transfer information, and determines a hit device to be a destination of the data and the transfer information. The transfer destination determining unit 41b deletes, from the transfer information, the device index value that was used to search in the transfer destination table 62b. The transfer destination determining unit 41b outputs, to the transfer processing unit. 21b, the transfer information from which the device index value has been deleted and the data, along with the address of the device determined using the transfer destination table 62b. When data and transfer information are input from the transfer source information adding unit 51 or the determination unit 52, the transfer destination determining unit 41a also performs, using the transfer destination table 62a, processing similar to the processing performed by the transfer destination determining unit 41b.

The server and a communication device other than the relay device 10 can also have a configuration similar to that in FIG. 3. In the case of the server and the communication device other than the relay device 10, processing that uses a protocol other than a protocol used in a network including these devices is not performed. Thus, the server or the communication device other than the relay device 10 includes one transmission/reception unit 11, one transfer processing unit 21, one routing table 22, one transfer information processing unit 40, and one transfer table 52.

The application processing unit 70 processes the input data using an application. In the example of FIG. 3, in order to facilitate understanding of the figure, a case in which one application processing unit 70 is included is described as an example, but the relay device 10 may include any number of application processing units 70. Further, the communication device other than the relay device 10 or the server may also include any number of application processing units 70. It is assumed that the application processing unit 70 holds an identifier (a module ID) so that each application processing unit 70 can be uniquely determined. A method for using a module ID will be described later.

Figure 4:
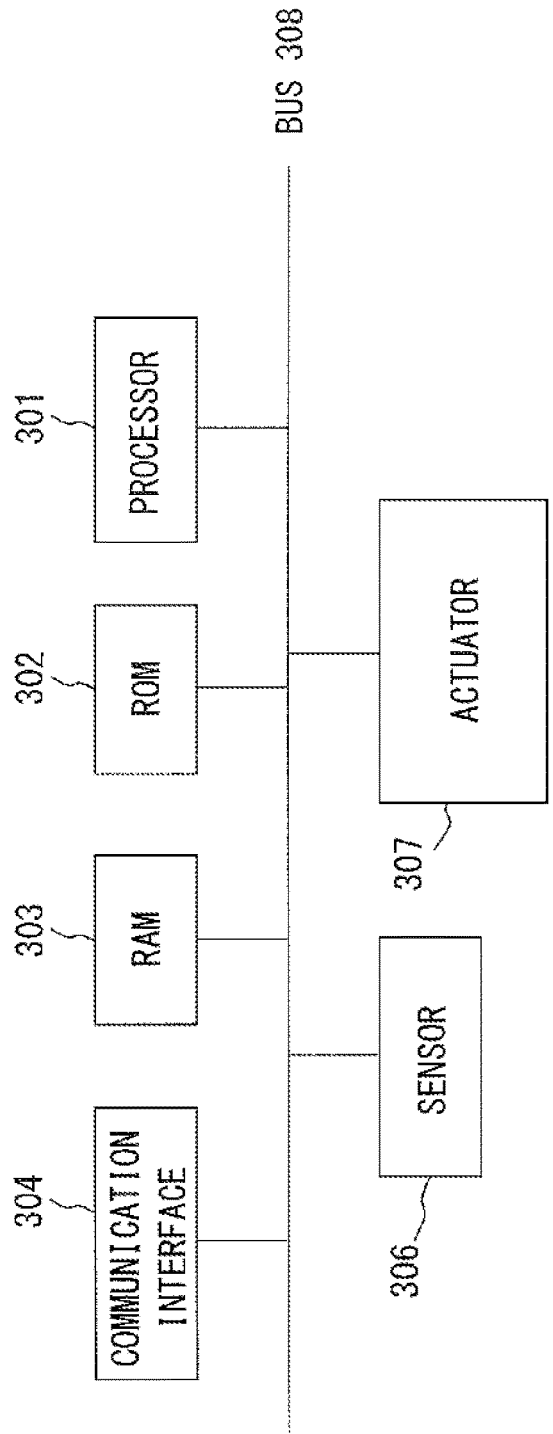

FIG. 4 illustrates an example of a hardware configuration. All of the server, the relay device 10, and the communication device other than the relay device 10 each include a processor 301, a read only memory (ROM) 302, a random access memory (RAM) 303, a communication interface 304, and a bus 308. From among the communication device and the relay device 10, a device that measures data that is to be reported to the server further includes a sensor 306 and an actuator 307. The processor 301 may be any processing circuit that includes a central processing unit (CPU). The processor 301 realizes the packet processing unit 20, the transfer information processing unit 40, the dispatcher 50, and the application processing unit 70.

For example, the processor 301 can read a program stored in the ROM 302 so as to execute it. The RAM 303 realizes the storage 60. The RAM 303 also properly stores data obtained from an operation of the processor 301 and data used for processing performed by the processor 301. The communication interface 304 is used to communicate with other devices, and operates as the transmission/reception unit 11. The bus 308 connects components such as the processor 301, the ROM 302, the RAM 303, and the communication interface 304, to one another such that they can perform transmission/reception of data mutually. Communication devices including the relay device 10 may be realized by, for example, a computer. The program may be provided stored in a non-transitory computer-readable recording medium so as to be installed in, for example, the relay device 10.

<Embodiment>

An example of processing performed in a system according to an embodiment will now be described. In this case, it is assumed that, in the system according to the embodiment, a transmission/reception of a packet is performed between a server and a device other than a server. Thus, the destination of a packet whose transmission source is a communication device other than a server is a server. Therefore, for example, when the node N2 and the node N4 that are not a server communicate with each other, the node N2 and the node M4 communication with each other through a server.

[Packet Format]

Figure 5:
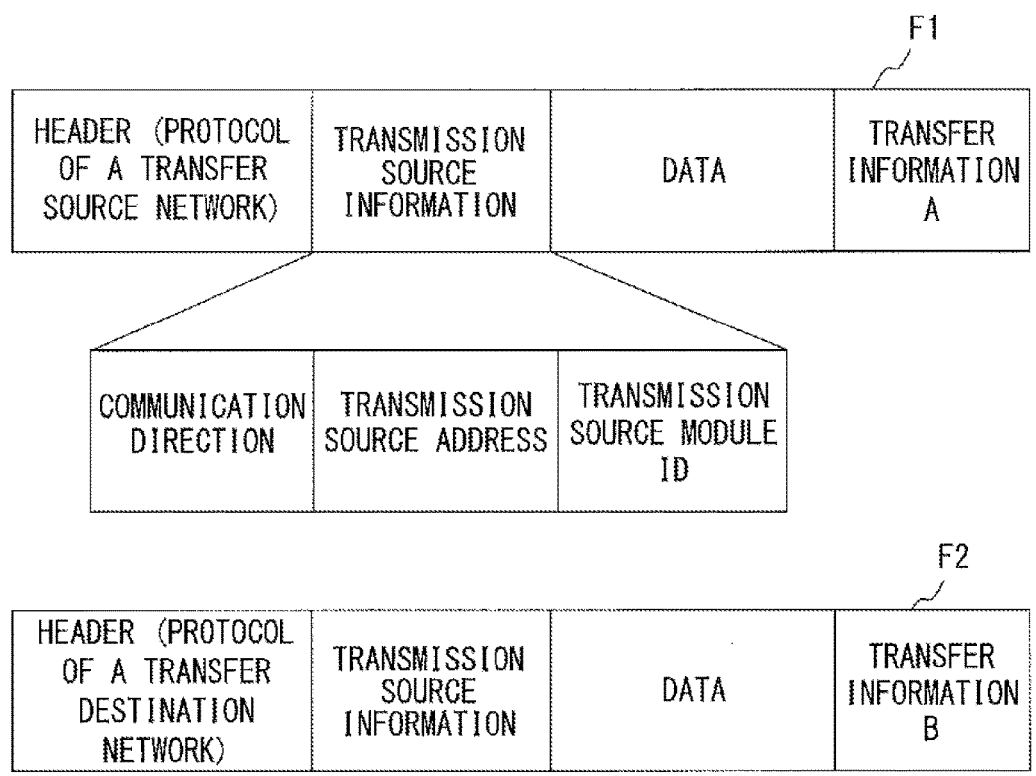

FIG. 5 illustrates an example of a packet format. A packet that is transmitted and received in a network includes a header, transmission source information, data, and transfer information, as represented by F1 of FIG. 5. The header is in a format that corresponds to a protocol used in a network, to which the packet is output. For example, the header of a packet that the node N5 of FIG. 2 receives from the network NE3 of FIG. 2 is a header in which the node N5 is set to be a destination of the packet using the protocol γ. On the other hand, the header of a packet that the node N5 outputs to the network NE2 is a header that is generated using the protocol β.

The transmission source information includes communication direction information, a transmission source address, and a transmission source module ID. The communication direction information is information that determines whether a packet is destined for a server or a device other than a server. In the following descriptions, it is assumed that the value of the communication direction information is set to zero in the packet destined for a server and is set to one in the packet destined for a device other than a server. The transmission source address is an address assigned to a device that generated data.

It is assumed that the transmission source address is an address determined by any method such that a device in a system can be uniquely determined. In the following descriptions, it is assumed that an address used as an identifier in the application processing unit 70 is assigned to each device, where the addresses have different values even between a certain device and another device that is included in a network other than a network to which the certain device belongs. In the following descriptions, as an example, with respect to each device, a string in which a letter N is followed by a number is used as an identifier used in the application processing unit 70 and is further used as a value that may foe set to be a transmission address. The transmission source address in the transmission source information is used by the application processing unit 70 and the dispatcher 50 in each device to recognize a device that generated data, so it does not have to be an address that is applicable to an actual routing. In other words, regardless of a protocol used for routing, the transmission source address is set by a method commonly used in the whole system, such that the application processing unit 70 and the dispatcher 50 can uniquely determine a device in the system. Further, processing performed in the application processing unit 70 is not dependent on a protocol used to transfer a packet.

The transfer information is route information that is used upon transferring a packet. The transfer information is generated in the process of processing of transferring a packet destined for a server, and is used to determine a transfer route of a packet destined for a device other than a server. Thus, if a device that operates as a relay device, such as the node N5 of FIG. 2, receives the packet represented by FX, the device changes the transfer /information included in the packet, as represented by F2. Specific examples of generating and changing transfer information will be described later.

[Example of Network]

Figure 6:
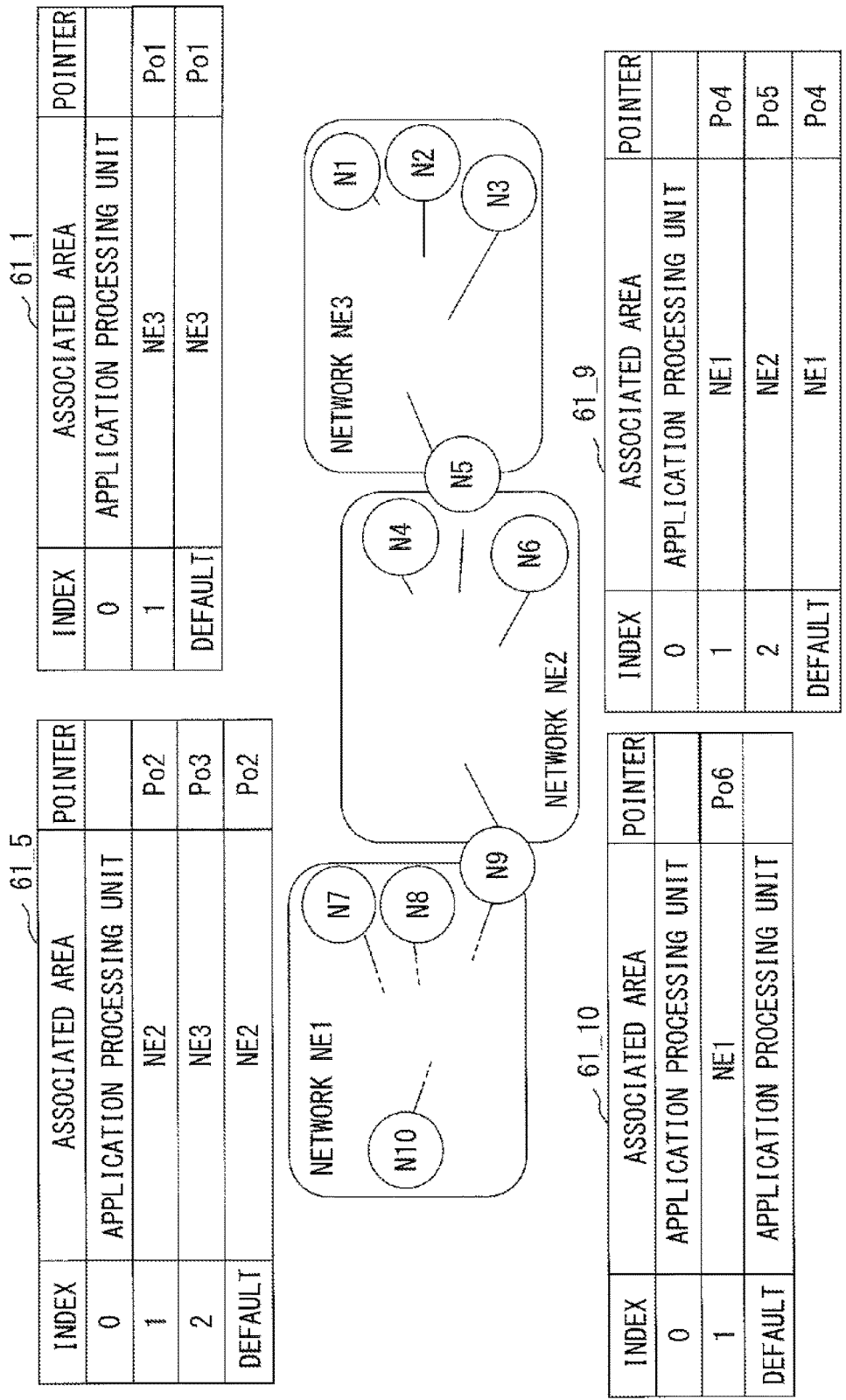

FIG. 6 illustrates an example of the sorting table 61. In the following descriptions, a number that is situated at the end of a symbol of a communication device that holds a table is placed after a numerical reference for the table, with an underscore between the number and the numerical reference. For example, a sorting table 61 held by the node N1 has the number "61_1". Likewise, in the following descriptions, in order to facilitate determination of which device is performing processing, even in the case of a numerical reference other than that for a table, a number that is situated at the end of a symbol of a communication device is placed after the numerical reference, with an underscore between the number and the numerical reference. For example, a dispatcher 50 held by the node N1 has the numerical reference "50_1", and a transfer information processing unit 40*b* held by the node N5 has the numerical reference "40*b*_5".

A sorting table 61 held by any device stores therein an associated area and a pointer in association with an index value (INDEX). The associated area represents a network that is associated with the index value. The associated area is used to determine a transfer source of a packet destined for a server and to determine a transfer destination of a packet transmitted from the server. When the associated area is the application processing unit 70, this means that data in which the device itself is set to be a destination has been input.

Each device holds a default associated area (DEFAULT). The default associated area is preset such that the default-associated area becomes a transfer route of a packet destined for a server when it is selected as an output destination of the packet. For example, it is assumed that, a node N10 is a server in the network illustrated in FIG. 6. In this case, the default associated area in a sorting table 61_5 held by the node N5 is the network NE2. Further, the default associated area in a sorting table 61_9 held by the node N9 is the network NE1. As described above, in each network, a setting is performed such that a packet arrives at the node N10 when the packet is output to a default associated area in the network.

The pointer is used to determine the transfer destination table 62 that is referred to according to the associated area. FIG. 7 illustrates an example of correspondence between the transfer destination table 62 and the sorting table 61. For example, the node N1 holds a sorting table 61_1 and a transfer destination table 62_1 in FIG. 7. Thus, a transfer source information adding unit 51_1 and a determination unit 52_1 can determine an output destination network for a packet by referring to the sorting table 61_1. When the output destination network for the packet is determined, a transfer destination device is determined using a transfer destination table 62 identified by use of a value of a pointer associated with the determined network. In an initial state, the transfer destination table 62 does not include a destination except for the destination of a default route in each network, but new information may be added in the process of communication processing. It is assumed that the setting of whether new information can be added to a transfer destination table 62 is recognized, in advance, by the transmission source adding unit 42 that manages the transfer destination table 62. An example of a method for changing a transfer destination table 62 will be described later.

It is assumed that, in the transfer destination table 62, a default route is set such that a packet arrives at the server when the default route is selected. For example, a packet destined for the server that is transmitted from the node N1 is transferred to the network NE2 through the node N5. Thus, in the sorting table 61_1 held by the node N1, the node N5 is set to be s default transfer destination. Further, with respect to the node N5, in a transfer destination table 62a_5, the node N5 itself is set to be a default transfer destination that corresponds to the network NE3, and in a transfer destination table 62b_5, the node N9 is set to be a default transfer destination that corresponds to the network NE2.

[Processing of Transferring Packet Destined for Server]

Figure 8:
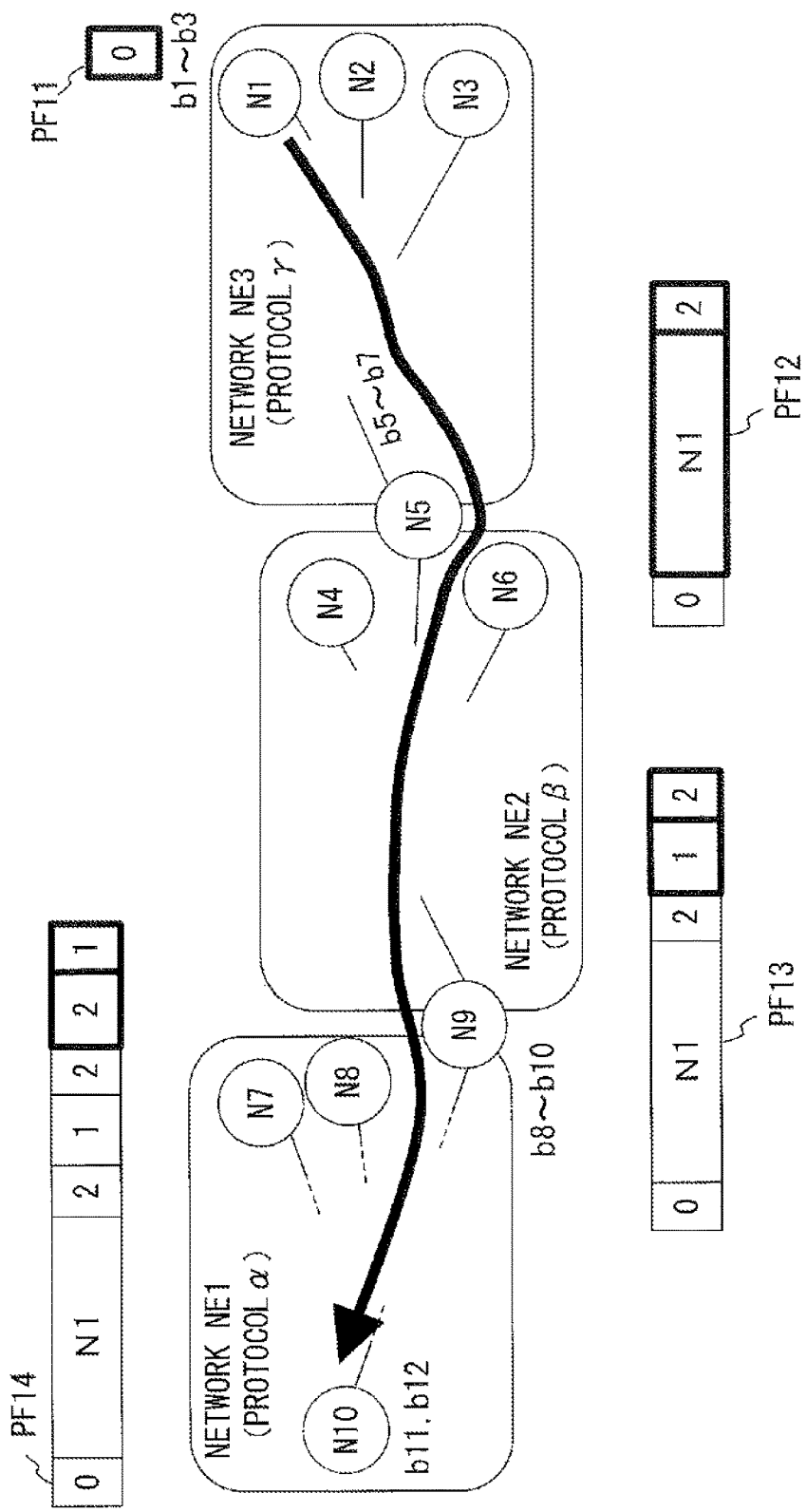
FIG. 8 illustrates an example of processing of transferring a packet destined for a server.

An example of processing of transferring a packet destined for a server will now be described with reference to FIG. 8. FIG. 8 illustrates a case in which the node N1 transmits a packet to the server (node N10). FIG. 8 describes, as an example, a case in which a device index value is the same as that of an address of each device in the network NE3.

In Procedure b1, it is assumed that a result of measurement performed in a sensor 306_1 in the node N1 is input to an application processing unit 70_1. Then, the application processing unit 70_1 generates data used to report the result of measurement performed in the sensor 306_1 to an application processing unit 70_10 of the node N10 that operates as a server. The application processing unit 70_1 outputs, to the transfer source information adding unit 51_1, the generated data along with information indicating that the destination of the data is the server.

In Procedure b2, in order to transmit the generated data, the transfer source information adding unit 51_1 generates transmission source information indicating that the data is destined for the server. The data is destined for the server, so the transfer source information adding unit 51_1 sets zero to be communication direction information. Further, in order to indicate that the data was generated in the application processing unit 70_1 of the node N1, the transfer source information adding unit 51_1 sets, to be a transmission source address, an address assigned to the node N1, and sets, to be a transmission source module ID, an index value assigned to the application processing unit 70. In this case, in order to report, on an application level, that a device that generated the data is the node N1, the transfer source information adding unit 51_1. sets a transmission source address of the transmission source information. Thus, it is sufficient, if an address in the transmission source information is an identifier that can be used in the application processing unit 70 and the dispatcher 50 of each of the node N1 and the node N10 even though the address is given in a form that does not correspond to any of the protocols α to γ.

The transfer source information adding unit 51_1 obtains, from the sorting table 61_1, an index value associated with the application processing unit 70_1 to be transfer information that is to be associated with, for example, data input from the application processing unit 70_1. As illustrated in FIGS. 6 and 7, in the sorting table 61_1, the index value associated with the application processing unit 70 is zero. Thus, the transfer source information adding unit 51_1 sets index value=0 in transfer information.

Next, the transfer source information adding unit 51_1 determines an output destination of a packet using the sorting table 61_1. The output destination of a packet including data destined for the server is an associated area associated with a default value in the sorting table 61_1. Thus, the transfer source information adding unit 51_1 determines the network NE3 to be an output destination of the packet. The transfer source information adding unit 51 outputs the data, the transmission source information, and the transfer information to the transfer destination determining unit 41 that performs processing that uses a protocol used in an output destination of a packet. The node N1 belongs only to the network NE3, so the transfer source information adding unit 51_1 outputs the data, the transmission source information, and the transfer information to a transfer destination determining unit 41_1. Further, the transfer source information adding unit 51_1 also outputs a pointer value associated with an associated area. In this example, Po1 is output as a pointer value to the transfer destination determining unit 41_1.

In Procedure b3, in order to transmit the packet, to the server, the transfer destination determining unit 41_1 obtains a transfer destination of the packet, in the network NE3. The transfer destination determining unit 41_1 determines a transfer destination by referring to a transfer destination table 62 associated with the pointer value reported from the transfer source information adding unit 51_1. In this example, pointer value=Po1 has been reported, so the transfer destination determining unit 41_1 refers to the transfer destination table 62_1 (FIG. 7). The information that, communication direction information=0 is included in the transmission source information, so the transfer destination determining unit 41_1 designates, as a transfer destination, a node set, in the transfer destination table 62_1, to foe a default transfer destination. In the example of FIG. 7, the node N5 is a transfer destination. Then, the transfer destination determining unit 41_1 outputs, to a transfer processing unit 21_1, the data, the transmission source information, and the transfer information that have been input from the transfer source information adding unit 51_1, along with information indicating that, the destination is the node N5.

The transfer processing unit 21_1 generates a header indicating that, the destination is the node N5 in accordance with the protocol γ, and adds the generated header to a payload including the data, the transmission source information, and the transfer information that have been input from the transfer destination determining unit 41_1. At this point, the transfer processing unit 21_1 properly obtains, from the routing table 22, information for routing in the network NE3. The transfer processing unit 21_1 outputs an obtained packet. P11 to a transmission/reception unit 11_1. The transmission/reception unit 11_1 transmits the packet P11 to the node N5. Here, the transfer information included in the packet P11 is represented by PF11 in FIG. 8.

In Procedure b4, the packet P11, passing through the network NE3, is transferred to the node N5.

In Procedure b5, a transmission/reception unit 11a_5 of the node N5 receives the packet P11, and outputs the packet P11 to a transfer processing unit 21a_5. The transfer processing unit 21a_5 outputs, to a transmission source adding unit 42a_5, the payload of the packet P11 along with a transmission source address of the packet P11. The transmission source adding unit 42a_5 determines whether the communication direction information included in the transfer source information of the input payload indicates that the destination is the server. Information that communication direction information=0 is included in the transmission source information of the packet P11, so the transmission source adding unit 42a_5 determines that processing of transferring data destined for the server is being performed.

Here, it is assumed that, in the network NE3, a value that is the same as that of an address of each device is used as a device index value, so a setting that bans an addition of new information to the transfer destination table 62a_5 has been performed in the transmission source adding unit 42a_5. Then, the transmission source adding unit 42a_5 adds, to the end of the transfer information, the address itself reported from the transfer processing unit 21a 5. As a result of the processing performed in the transmission source adding unit 42a_5, the transfer information becomes "0, N1". The transmission source adding unit 42a_5 outputs, to a transfer source information adding unit 51a_5, the processed transfer information along with the data and the transmission source information.

In Procedure b6, when the data and the other pieces of information are input from the transmission source adding unit 42a_5, the transfer source information adding unit 51_5 checks the communication direction information in the transmission source information. Zero is set to be the communication direction information in the packet P11, so the transfer source information adding unit 51_5 determines that it has obtained data to be transferred to the server. Then, the transfer source information adding unit 51_5 starts performing processing to add a network index value of the transmission source to the transfer information. The transfer source information adding unit 51_5 determines, from the sorting table 61_5 (FIG. 7), an index value of a network with which it is communicating through the transfer information processing unit 40a_5 that input the data and the other pieces of information. In this case, the data and the other pieces of information have been input from the transmission source adding unit 42a_5, so the transfer source information adding unit 51_5 adds, to the transfer information, two, which is a network index value associated with the network NE3. Thus, the transfer information is changed as represented by PF12 of FIG. 8.

Next, the transfer source information adding unit 51_5 determines an output destination of the data using the sorting table 61_5. The output destination of data destined for the server is an associated area associated with a default value in the sorting table 61_5, so the transfer source information adding unit 51_5 determines the network NE2 to be a transfer destination network of the packet. The transfer source information adding unit 51_5 outputs the data, the transmission source information, and the transfer information to the transfer destination determining unit 41b_5 that determines a destination of a packet in a network that is a transfer destination of the packet. Further, the transfer source information adding unit 51_5 also outputs, to the transfer destination determining unit 41b_5, the information that the pointer value corresponding to the output destination network is Po2.

In Procedure b7, pointer value=Po2 is reported to the transfer destination determining unit 41b_5, and the transmission source information input to the transfer destination determining unit 41b_5 includes information that communication direction information=0. Thus, the transfer destination determining unit 41b_5 determines, to be a destination in the network NE2, the node N9 that is a transfer destination set to be a default route in the transfer destination table 62b_5 (FIG. 7). The transfer destination determining unit 41b_5 outputs, to a transfer processing unit 21b_5, the data, the transmission source information, and the transfer information PF12, along with information indicating that the destination of the packet is the node N9. Processing performed in the transfer processing unit 21b_5 is similar to the processing performed in the transfer processing unit 21_1 that has been described in Procedure b3, but the protocol used by the transfer processing unit 21b_5 is the protocol β. A packet generated by the processing performed in the transfer processing unit 21b_5 is hereinafter referred to as a packet P12. The packet P12 is transferred to the node N3, passing through the network NE2, via a transmission/reception unit 11b_5.

In Procedure b8, when the node N9 receives the packet P12, it is reported to a transmission source adding unit 42a 9 that, the transmission source is the node N5. Further, the data, the transmission source information, and the transfer information in the packet P12 are also input to the transmission source adding unit 42a_9. Processing that is performed when information on a transmission source, and the data, the transmission source information, and the transfer information that are included in the packet P12 are input to the transmission source adding unit 42a_9 is similar to that in Procedure b5.

FIG. 9 is a diagram for explaining an example of a method for updating the transfer destination table 62. In the following descriptions, it is assumed that the node N9 holds transfer destination tables 62a_9 and 62b_9 when it receives the packet P12. It is further assumed that, a setting that bans an addition of new information to the transfer destination table 62a_9 has not been performed in the transmission source adding unit 42a_9 of the node N9.

The transmission source adding unit 42a_9 searches for information in the transfer destination table 62a_9 using an address reported from a transfer processing unit 21a_9 as a key. In this case, a search is performed using an address of the node N5 as a key. However, there does not exist an index value associated with the node N5 in the transfer destination table 62a_9, so no entry is hit. Then, the transmission source adding unit 42a_9 generates an index value corresponding to the node N5 such that it is not the same as those of other nodes registered in the transfer destination table 62a_9, and registers the index value of the node N5 in the transfer destination table 62a_9, For example, when it determines one to be the index value of the node N5, the transmission source adding unit 42a_9 updates the transfer destination table 62a_9 to a transfer destination table 62c_9.

Further, the transmission source adding unit 42a_9 adds the index value of the node N5 to the end of the transfer information. Then, as a result of the processing performed in the transmission source adding unit 42a_9, the transfer information becomes "0, N1, 2, 1". The transmission source adding unit 42a_9 outputs, to a transfer source information adding unit 51a_9, the processed transfer information along with the data and the transmission source information.

In Procedure b9, the transfer source information adding unit 51_9 determines, from the sorting table 61_9 (FIG. 9), an index value of a network from which the data has been transferred, in order to add, to the transfer information, information about a network from which the data has been obtained. In this case, the data and the other pieces of information have been input from the transmission source adding unit 42a_9, so the transfer source information adding unit 51_9 adds, to the transfer information, two, which is a network index value associated with the network NE2. Thus, the transfer information is changed as represented by PF13 of FIG. 8.

Further, using the communication direction information in the transmission source information input from the transmission source adding unit 42a_9, the transfer source information adding unit 51_9 determines that it has obtained data to be transferred to the server. Then, the transfer source information adding unit 51_9 determines, to be a transfer destination of the packet, the network NE1 that is an associated area associated with a default value in the sorting table 61_9. In order to output the data to the network NE1, the transfer source information adding unit 51_9 outputs the data, the transmission source information, and the transfer information to a transfer destination determining unit 41b_9. Further, the transfer source information adding unit 51_9 also outputs, to the transfer destination determining unit 41b_9, information that the pointer value corresponding to the output destination is Po4.

In Procedure b10, pointer value=Po4 is reported to the transfer destination determining unit 41b_9, and the transmission source information input to the transfer destination determining unit 41b_9 includes information, that communication direction information=0. Thus, the transfer destination determining unit 41b_9 determines, to be a destination in the network NE1, the node N10 that is a transfer destination set to be a default route in the transfer destination table 62b_9 (FIG. 9). The transfer destination determining unit 41b_9 outputs, to a transfer processing unit 21b_9, the data, the transmission source information, and the transfer information PF13, along with information indicating that the destination of the packet is the node N10. Processing performed in the transfer processing unit 21b_9 is similar to the processing performed in the transfer processing unit 21_1 that has been described in Procedure b3, but the protocol used by the transfer processing unit 21b_9 is the protocol α. A packet generated by the processing performed in the transfer processing unit 21b_9 is hereinafter referred to as a packet P13. The packet P13 is transferred to the node N10, passing through the network NE1, via a transmission/reception unit 11b_9.

In Procedure b11, when the node N10 receives the packet P13, information indicating that the transmission source is the node N9, and the data, the transmission source information, and the transfer information that are included in the packet P13 are input to the transmission source adding unit 42a_10. Processing that is performed when information on a transmission source, and the data, the transmission source information, and the transfer information that are included in the packet P13 are input to the transmission source adding unit 42a_10 is similar to that in Procedure b5.

FIG. 10 is a diagram for explaining an example of a method for updating the transfer destination table 62 in the node N10. In the following descriptions, it is assumed that the node N10 has a transfer destination table 62_10a when it receives the packet P13. It is further assumed that a setting that bans an addition of new information to the transfer destination table 62_10a has not been performed in the transmission source adding unit 42_10. When an address of the node N9 that is the transmission source of the packet P13 is not included in the transfer destination table 62_10a, the transmission source adding unit 42_10 generates the index value of the node N9, as is the case with the method described with reference to FIG. 3. Further, the transmission source adding unit 42_10 registers the index value of the node NS in the transfer destination table 62. For example, when two is determined to be the index value of the node N9, the transfer destination table 62_10a is updated to a transfer destination table 62_10b.

Further, the transmission source adding unit 42_10 adds the index value of the node N9 to the end of the transfer information, so the transfer information becomes "0, N1, 2, 1, 2, 2". The transmission source adding unit 42_10 outputs, to a transfer source information adding unit 51_10, the processed transfer information along with the data and the transmission source information.

In Procedure b12, the transfer source information adding unit 51_10 adds, to the end of the transfer information, an index value of the network NE1 from which the data has been transferred, in order to add, to the transfer information, information about a network from which the data has been obtained. A method for determining an index value is similar to that in Procedure b9. Thus, the transfer information is changed as represented by PF14 of FIG. 8. Using the communication direction information in the transmission source information input from the transmission source adding unit 42_10, the transfer source information adding unit 51_10 determines that it has obtained data destined for a server (the node N10). Then, the transfer source information adding unit 51_10 determines, to be an output destination of the data, the application processing unit 70_10 that is an associated area associated with a default value in a sorting table 61_10. The transfer source information adding unit 51_10 outputs the data, the transmission source information, and the transfer information to the application processing unit 70_10. The application processing unit 70_10 obtains, from the input data, a result of measurement performed in the sensor 306_1 of the node N1, so as to properly perform processing by use of the measurement result. Further, the application processing unit 70_10 stores a route to the node N1 using the obtained transfer information and transmission source information.

Figure 11:
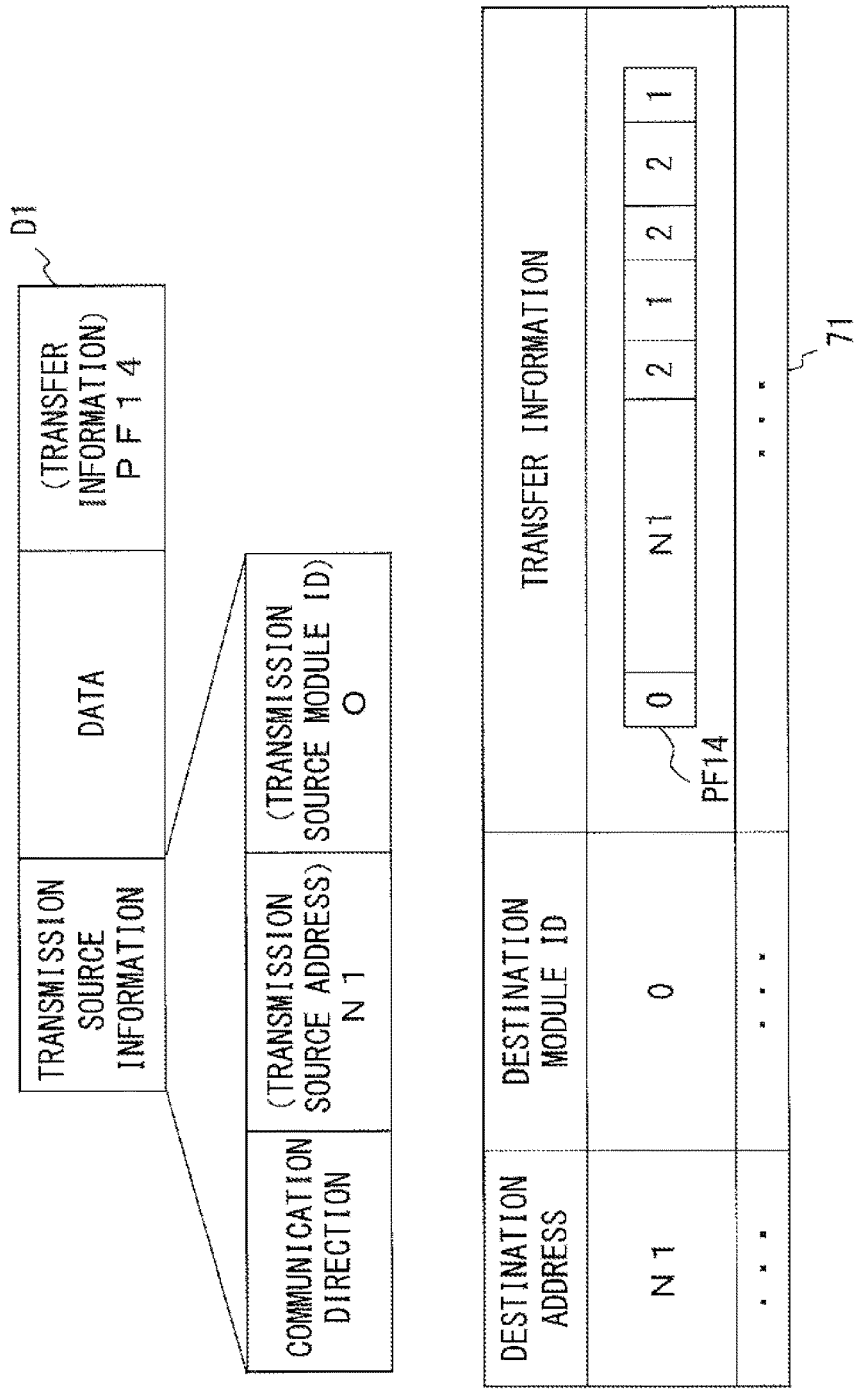
FIG. 11 is a diagram for explaining an example of a method for storing transfer information.

FIG. 11 is a diagram for explaining an example of a method for storing transfer information. In a server, the application processing unit 70 stores transfer information in association with a transmission source address and a transmission source module ID that are included in transmission source information. FIG. 11 illustrates information D1 input to the application processing unit 70 in Procedure b12 and a table 71 held by the application processing unit 70. The information D1 input to the application processing unit 70 includes transfer information PF14, the data included in the packet P13, and transmission source information. The transfer information stored in the application processing unit 70 is used as information about a route to a destination device when a packet is transmitted from the server. Thus, in the table 71 of FIG. 11, a transmission source address in the transmission source information is recorded in DESTINATION ADDRESS. Likewise, a transmission source module ID in the transmission source information is set in DESTINATION MODULE ID. Therefore, in the case of the application processing unit 70, the destination address is an address of the node N1, and the transfer information PF14 is recorded as transfer information that is used when the transmission source module ID is zero.

For simplification, a case in which one application processing unit 70 operates in each device has been described above, but the number of application processing units 70 that operate in each device may be changed according to the number of applications used. Thus, the transmission source module ID is used to determine an application that generated data. The application processing unit 70_10 records therein transfer information in association with not only a transmission source address but also a transmission source module IE) because an application that uses data to be transmitted by use of the transfer information can also be determined by the transfer information.

[Processing of Transferring Packet Transmitted From Server]

Figure 12:
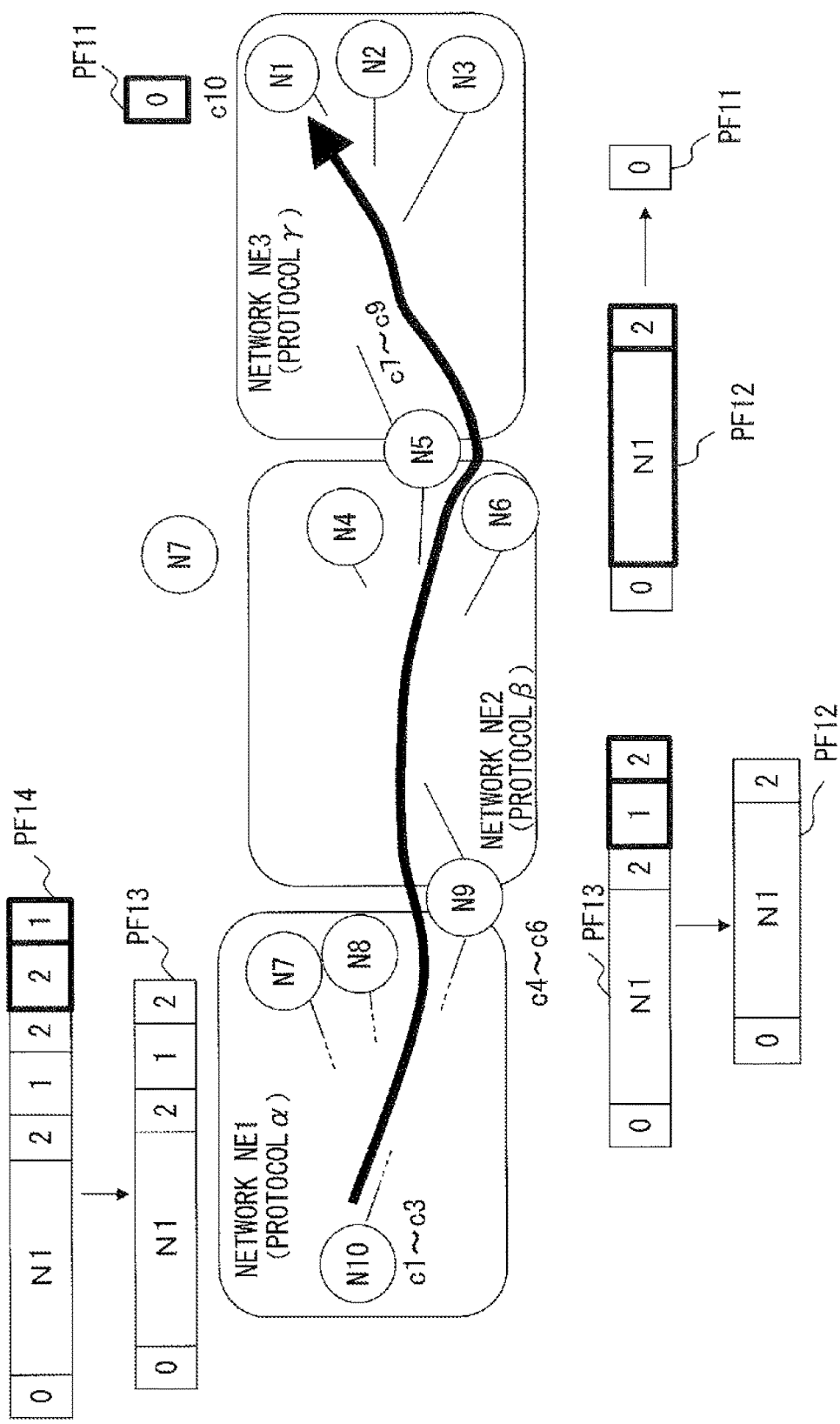
FIG. 12 is a diagram for explaining an example of processing of transferring a packet transmitted from a server.

Referring to FIG. 12, examples of processing that is performed when a packet is transmitted from a server and processing of a packet transmitted from a server are described, using, as an example, a case in which the node N10 transmits a packet to the node N1. Also in the example of FIG. 12, it is assumed that the node N10 operates as a server. Processing described below can be performed when a server transmits a packet to a device from, which the server received a packet in the past.

In procedure c1, it is assumed that, as a result of processing a measurement value obtained from the sensor 306_1 of the node N1, the application processing unit 70_10 of the node N10 determines that a manipulation is to be performed on an actuator 307_1 of the node N1. Further, in the following example, it is assumed that the node N10 can manipulate the actuator 307_1 indirectly by making a request for the application processing unit 70_1 to perform processing on the actuator 307_1. In this case, the application processing unit 70_10 generates data and other information destined for the application processing unit 70_1 that are used for making a request for the application processing unit 70_1 to perform processing on the actuator 307_1. Further, the application processing unit 70_10 generates transmission source information to be attached to the data and searches for transfer information indicating that the destination is the node N1. The transmission source information includes communication direction information=1 in order to indicate that it is a packet destined for a device other than a server. Further, the application processing unit 70_10 sets the transmission source device and the transmission source module ID in the transmission source information.

From among pieces of information stored by the method that has been described with reference to FIG. 11, the application processing unit 70_10 determines an entry in which a destination address is an identifier assigned to the node N1. Further, the application processing unit 70_10 also determines whether a module ID used to identify an application that processes, in the node N1, data to be included in a packet that will be transmitted is consistent with the destination module ID of a hit entry. In other words, the application processing unit 70_10 determines the transfer information PF14 in an entry in which a combination of a destination address and a destination module ID represents the application processing unit 70_1 in the node N1. The application processing unit 70 outputs the data, the transmission source information, and the determined transfer information PF14 to a determination unit. 52_10.

In Procedure c2, the determination unit 52_10 obtains a network index value situated at the end of the transfer information input from the application processing unit 70_10. The network index value obtained by the determination unit 52_10 is a network index value that is added when the node N10 processes a packet, that includes data transmitted from the node N1. In the example of FIG. 12, the determination unit 52_10 obtains network index value=1. The determination unit 52_10 searches in the sorting table 61_10 (FIG. 10) using the obtained index value as a key, so as to determine a network to be used to transmit the input data. In the example of FIG. 10, network index value=1 is associated with the network NE1 and pointer value=Po6. The determination unit 52_10 deletes, from the transfer information, the index value that was used to determine a network. Thus, the transfer information becomes "0, N1, 2, 1, 2, 2". Further, the determination unit 52_10 outputs, to a transfer destination determining unit 41_10, the transfer information from which the index value has been deleted, along with the data and the transmission source information. At this point, the determination unit 52_10 also reports pointer value=Po6 to the transfer destination determining unit 41_10.

In Procedure c3, when the transfer information and the other pieces of information have been input from the determination unit 52_10, the transfer destination determining unit 41_10 searches in a transfer destination table 62 that is associated with the reported pointer value, using a device index value situated at the end of the transfer information as a key. In this case, the reported pointer value, is Po6, so the search target is a transfer destination table 62_10*b* (FIG. 10). The obtained device index value situated at the end of the transfer information is two, so the transfer destination determining unit 41_10 determines the node N9 in the network NE1 to be a transfer destination. Then, the transfer destination determining unit 41_10 deletes, from the transfer information, the device index value that was used to search in the transfer destination table 62_10*b*, so the transfer information is changed as represented by PF13 of FIG. 12. The transfer destination determining unit 41_10 outputs, to a transfer processing unit 21_10, the transfer information PF13, the data, and the transmission source information, along with information indicating that the destination of the packet is the node N9.

The transfer processing unit 21_10 generates, according to the protocol α, a header indicating that the destination is the node N9 and adds the header to a payload that includes the data, the transmission source information, and the transfer information PF13 that are input from the transfer destination determining unit 41_10, so as to generate a packet P15. At this point, the transfer processing unit 21_10 properly obtains, from a routing table 22_10, information that is used for routing in the network NE1. The transfer processing unit 21_10 outputs the obtained packet P15 to a transmission/reception unit 11_10. The transmission/reception unit 11_10 transmits the packet P15 to the node N9.

In Procedure c4, a transmission/reception unit 11_9 of the node MS receives the packet P15 and outputs the packet P15 to a transfer processing unit 21*b*_9 . The transfer processing unit 21*b*_9 outputs the payload to a transmission source adding unit 42*b*_9, Further, the transfer processing unit 21*b*_9 extracts information on the transmission source of the packet P15 and reports the information to the transmission source adding unit 42*b*_9.

The transmission source adding unit 42*b*_9 extracts the data, the transmission information, and the transfer information from the input payload, and determines whether the communication direction information in the transmission source information indicates that the destination is the server. Information that communication direction information=1 is included in the transmission source information of the packet P15, so the transmission source adding unit 42*b*_9 determines that processing of transferring the data transmitted from the server is being performed. Then, the transmission source adding unit 42$b$_9 outputs, to a determination unit 52_9, the transmission source information, the data, and the transfer information PF13 that have been obtained from the payload. Further, route information is not generated while performing processing of transferring the data transmitted from the server, so the transmission source adding unit 42$b$_9 discards the information on a transmission source that has been reported from the transfer processing unit 21$b$_9.

In Procedure c5, the determination unit 52_9 obtains a network index value situated at the end of the transfer information PF13 input from the transmission source adding unit 42$b$_9. The network index value obtained by the determination unit 52_9 is a network index value that is added by the determination unit 52_9 when the node N9 receives a packet destined for the server that is transmitted from the node N1. In the example of FIG. 12, the determination unit 52_9 obtains network index value=2. Using the obtained index value and the sorting table 61_9 (FIG. 9), the determination unit 52_9 determines that a packet including the data is to be transmitted to the network NE2 and that the pointer value for the network NE2 in the transfer destination table 62 is Po5. Further, the determination unit 52_9 deletes, from the transfer information PF13, the index value that was used to determine a network, so as to update the transfer information to "0, N1, 2, 1".

Processing of transmitting data to the network NE2 is performed in, for example, a transfer information processing unit 40$a$_9. Thus, the determination unit 52_9 outputs, to the transfer destination determining unit 41$a$_9, the updated transfer information, along with the data and. the transmission source information. At this point, the determination, unit 52_9 also reports pointer value=Po5 to the transfer destination, determining unit 41$a$_9.

In Procedure c6, when the transfer information and the other pieces of information have been input, the transfer destination determining unit 41$a$_9 refers to the transfer destination table 62$c$_9 (FIG. 9) that is associated with the reported pointer value Po5, using a device index value situated at the end of the transfer information as a key. The device index value obtained by the transfer destination determining unit 41$a$_9 from the transfer information is one, so, from the transfer destination table 62$c$_3, the transfer destination determining unit 41$a$_9 determines the node N5 in the network NE2 to be a transfer destination. Then, the transfer destination determining unit 41$a$_9 deletes, from the transfer information, the device index value that was used to search for a transfer destination, so the transfer information is changed as represented by PF12 of FIG. 12. The transfer destination determining unit 41$a$_9 outputs, to the transfer processing unit 21$a$_9, the transfer information PF12, the data, and the transmission source information, along with information indicating that the destination of the packet is the node N5.

Processing performed in the transfer processing unit 21$a$_9 is similar to the processing performed in the transfer processing unit 21_10 in Procedure c3, but the protocol used to generate a header is the protocol β. The packet generated by the transfer processing unit 21$a$_3 is hereinafter referred to as a packet P16. The packet P1 6 is transmitted from a transmission/reception unit 11$a$_9 to the node N5, passing through the network NE2.

In Procedure c7, when the node N5 receives the packet. P16, processing similar to the processing performed in the node N9 that, has been described in Procedure c4 is performed. Thus, the payload in the packet P16 is input to a transmission source adding unit 42$b$_5. The transmission source adding unit 42$b$_5 determines whether the communication direction information, in the input payload indicates that the destination is the server. Information that communication direction information=1 is included in the transmission source information of the packet. P16, so the transmission source adding unit 42$b$_5 determines that processing of transferring the data transmitted from the server is being performed. Then, the transmission source adding unit 42$b$_5 outputs, to a determination unit 52_5, the transmission source information, the data, and the transfer information PF13 that have been obtained from the payload.

In Procedure c8, the determination unit 52_5 obtains a network index value situated at the end of the transfer information PF12 input from the transmission source adding unit. 42$b$_5. In the example of FIG. 12, the determination unit 52_5 obtains network index value=2.Using the obtained index value and the sorting table 61_5 (FIG. 7), the determination unit 52_5 determines that a packet, including the data is to be transmitted to the network NE3 and that the pointer value for the network NE3 in the transfer destination table 62 is Po3. Further, the determination unit 52_5 deletes, from the transfer information PF12, the index value that, was used to determine a network, so as to update the transfer information to "0, N1".

Processing of transmitting data to the network NE3 is performed in, for example, a transfer information processing unit 40$a$_5. Thus, the determination unit 52_5 outputs, to the transfer destination determining unit 41$a$_5, the updated transfer information, along with the data and the transmission source information.

As described in Procedure b5, it is assumed that the determination unit 52_5 has stored the fact, that a setting that, bans an addition of new information to the transfer destination table 62$a$_5 has been performed in the transmission source adding unit 42$a$_5. In this case, the node N5 has not set an index value for a device included in the network NE3, so the transfer information does not include the index value. Thus, the transfer information processing unit 40$a$_5 does not refer to the transfer destination table 62$a$_5 upon, determination of a transfer destination, so the determination unit 52_5 does not report a pointer value to the transfer destination determining unit 41$a$_5.

In Procedure c9, when the transfer information and the other pieces of information have been input, the transfer destination determining unit 41$a$_5 obtains information situated at the end of the transfer information. At this point, the transfer destination determining unit 41$a$_5 has not set an index value for a device in the network NE3. Thus, the transfer destination determining unit 41$a$_5 obtains, from the transfer information, an address of a destination device. In the example of FIG. 12, the transfer destination determining unit 41$a$_5 obtains the address of the node N1. Further, the transfer destination determining unit 41$a$_5 deletes, from the transfer information, the address of the node N1, so as to update the transfer information to PF11. The transfer destination determining unit 41$a$_5 outputs, to the transfer processing unit 21$a$_5, the transfer information PF11, the data, and the transmission source information, along with information indicating that the destination of the packet is the node N1.

Processing performed in the transfer processing unit 21$a$_5 is similar to the processing performed in the transfer processing unit 21_10 in Procedure c3, but the protocol used to generate a header is the protocol γ. The packet generated by the transfer processing unit 21$a$_5 is hereinafter referred to as a packet P17. The packet P17 is transmitted from the transmission/reception unit 11a_5 to the node N1, passing through the network NE3.

In Procedure c10, the node N1 receives a packet including transfer information P11. When it determines, using the transmission source information, that it has received a packet from the server, the transfer destination determining unit 41_1 outputs a payload of the packet to the determination unit 52_1. The determination, unit 52_1 outputs the data to the application processing unit 70_1 using, the transfer information P11 and the sorting table 61_1. Thus, the application processing unit 70_1 can process data generated in the application processing unit 70_10. The application processing unit 70_1 processes the data from the application processing unit 70_10, so as to properly perform processing on the actuator 307_1.

Figure 13:
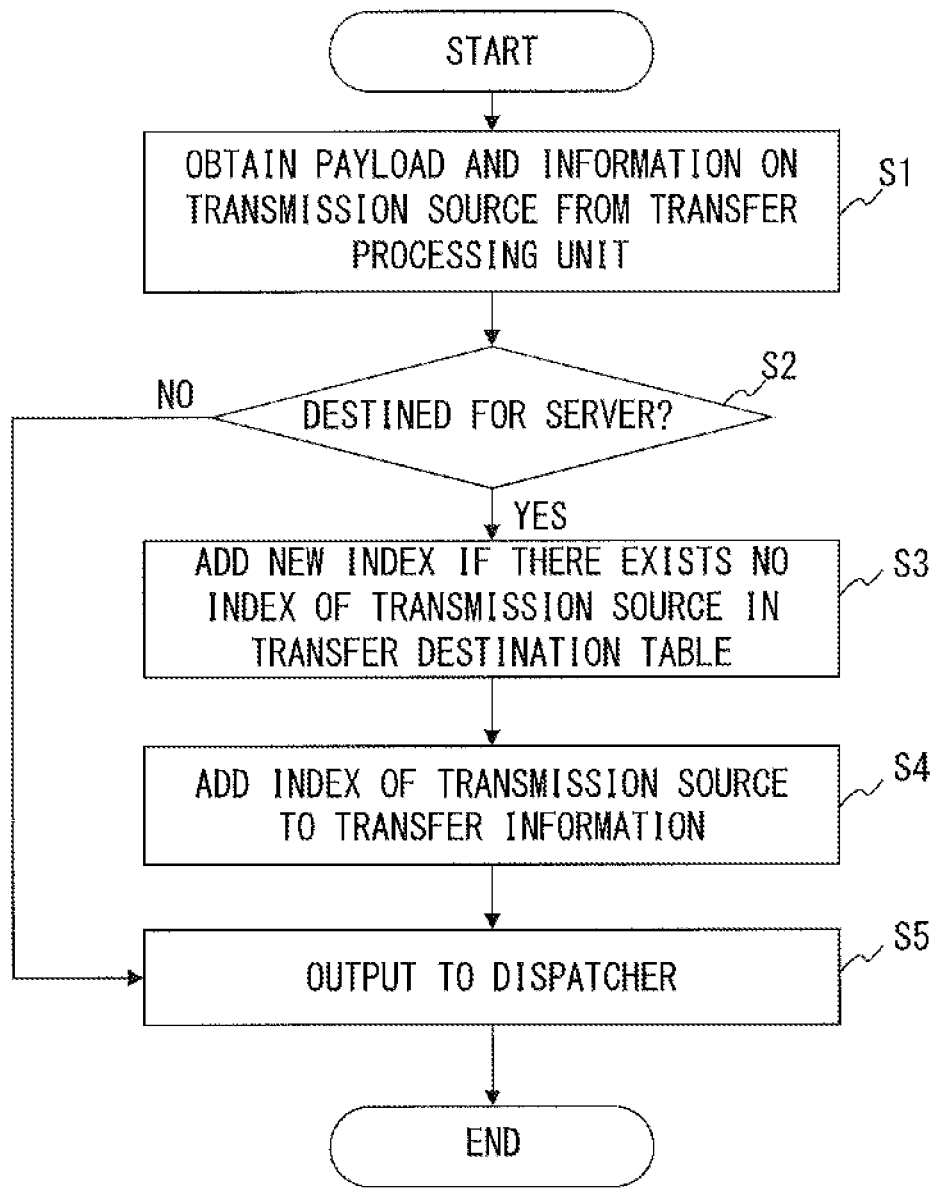
FIG. 13 is a flowchart that illustrates an example of processing performed in a transfer information processing

FIG. 13 is a flowchart that illustrates an example of processing that is performed by the transfer information processing unit 40. FIG. 13 illustrate an example of processing performed when data in a packet received from a device other than that of the transfer information processing unit 40 is input to the transfer information processing unit 40. FIG. 13 is an example of the processing, and, for example, the order of Steps S3 and S4 may be changed. The transmission source adding unit 42 obtains a payload of a received packet and an address of the transmission source of the received packet through the transmission/reception unit 11 and the transfer processing unit 21 (Step S1). Using communication direction information in transmission source information, the transmission source adding unit 42 determines whether data destined for a server is included in the obtained payload (Step S2). When the obtained payload includes data destined for the server, the transmission source adding unit 42 determines whether an index value of the transmission source is included in the transfer destination table 62 (Yes in Step S2). When there does not exist, in the transfer destination table 62, an index value associated with the transmission source, the transmission source adding unit 42 adds, to the transfer destination table 62, an index value associated with the transmission source (Step S3). Further, the transmission source adding unit 42 adds, to transfer information, a device index value associated with the transmission source device (Step S4). Then, the transmission source adding unit 42 outputs, to the dispatcher 50, the transmission source information, the data, and the updated transfer information (Step S5). On the other hand, when the obtained payload does not include the data destined for the server, the transmission source adding unit 43 outputs, to the dispatcher 50, the transmission source information, the data, and the updated transfer information (No in Step S2, Step S5).

FIG. 14 is a flowchart that illustrates an example of processing performed in the dispatcher 50. The dispatcher 50 obtains the transmission source information, the data, and the transfer information that are included in the payload of the received packet. Here, it is assumed that the data destined for the server and the other pieces of information are obtained by the transfer source information adding unit 51, and data and other pieces of information that are included in a packet transmitted from the server to a device other than a server is obtained by the determination unit 52 (Steps S11, S12). The transfer source information adding unit 51 adds, to the end of the transfer information, a network index value of a network that includes the transmission source of the packet (Yes in Step S12, Step S13). Further, the transfer source information adding unit 51 determines if its node is a server (Step S14). Here, it is assumed that the transfer source information adding unit 51 determines whether an associated area that is set to be a default in the sorting table 61 is the application processing unit 70, so as to determine whether its node is a server. When its node is not a server, the transfer source information adding unit 51 outputs, to a transfer destination determining unit 41 associated with the associated area that is given in DEFAULT of the sorting table 61, the input transmission source information, the input data, and the input updated transfer information (No in Step S14, Step S17). On the other hand, when its node is a server, the transfer source information adding unit 51 outputs, to the application processing unit 70, the input transmission source information, the input data, and the input updated transfer information (Yes in Step S14, Step S18).

On the other hand, the determination unit 52 obtains an index value situated at the end of the transfer information transmitted along with the data generated in the server, and deletes the obtained index value from the transfer information (No in Step S12, Step S15). The determination unit 52 determines whether it has obtained data destined for its node using the obtained index value (Step S16). Here, it is assumed that, the determination unit 52 determines whether an associated area corresponding to the obtained index value is the application processing unit 70, so as to determine whether the data is destined for its node. When the index value is associated with the application processing unit 70 in the sorting table 61, the determination unit 52 determines that it has obtained data destined for its node, and outputs the transmission source information and the data to the application processing unit 70 (Yes in Step S16, Step S19). On the other hand, when the index value is not associated with the application processing unit 70 in the sorting table 61, the determination unit 52 outputs the data and the updated transfer information to a transfer destination determining unit 41 associated with the obtained index value (No in Step S16, Step S20).

Figure 15:
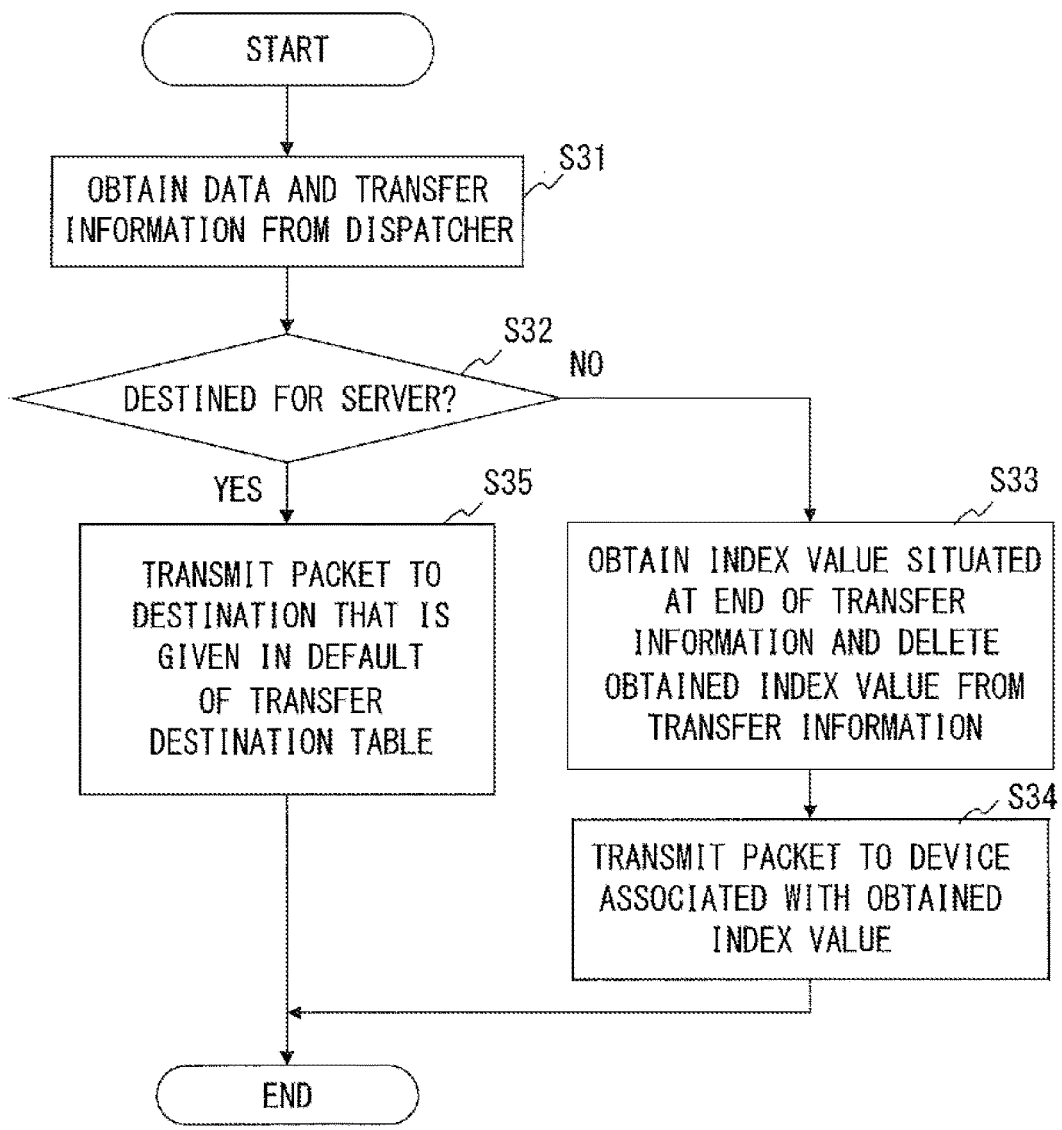
FIG. 15 is a flowchart that illustrates an example of processing that, is performed upon transferring data in a received packet.

FIG. 15 is a flowchart that illustrates an example of processing that, is performed upon transferring data in a received packet. The transfer destination determining unit 41 obtains data, transmission source information, and transfer information from the determination unit 52 or the transfer source information adding unit 51 (Step S31). Using communication direction information in the transmission source information, the transfer destination determining unit 41 determines whether data destined for the server has been input (Step S32). When the obtained payload does not include data destined for the server, the transfer destination determining unit 41 obtains an index value situated at the end of the transfer information and deletes the obtained index value from the transfer information (No in Step S32, Step S33). Further, the transfer destination determining unit 41 designates, as a destination, a device associated with the obtained index value, and outputs the transmission source information, the data, and the transfer information to the transfer processing unit 21. The transfer processing unit 21 adds, to the payload, a header destined for the device reported from the transfer destination determining unit 41, and performs transmission processing through the transmission/reception unit 11 (Step S34). The payload includes the transmission source information, the data, and the transfer information. On the other hand, when the obtained payload includes data destined for the server, the transfer destination determining unit 41 designates, as a destination, a device that is set to be a default in the transfer destination table 62, and outputs, to the transfer processing unit 21, the payload including the data and the other pieces of information including the data, the transfer information, and the other information (Step S35). As a result of the processing performed in, for example, the transfer processing unit 21, the packet is transmitted to the device that is set to be a default in the transfer destination table 62.

As described above, using an index value included in a packet, a device that relays between networks can determine a transfer destination network and a destination of the packet in the transfer destination network. In other words, a transfer destination network is reported from a device at a server side to a device that relays between networks, so a relay device can manage, for each set of adjacent networks, information on a protocol used for transfer processing. Thus, the relay device does not store a protocol used for transfer processing and a transfer destination for each transfer destination, so a smaller amount of information needs to be held by the relay device when transfer processing is performed.

Further, in transfer information, a device index value is used instead of an address of a device, so, when the transfer information is used, fewer bits need to be used to report information about, a route, compared to when the entire route is designated by use of an address of, for example, a relay device. Thus, when transfer information is used, it is possible to make an amount of data included in one packet larger, compared to when the entire route is designated by use of an address of, for example, a relay device. As a result, in the system according to the embodiment, it is possible to transmit and receive data efficiently even when communication is performed between networks of different protocols.

In the example above, an example in which a device that includes the sensor 306 reports a measurement value to a server, so as to perform processing on the actuator 307 on the basis of a packet from the server has been described, but this is merely an example. Similar transfer processing is also performed even when a packet used for other applications is transmitted and received.

<Application Example>

FIG. 16 illustrates a specific example of a system that uses three different protocols. In FIG. 16, it is assumed that a device index value that is different from an address of a corresponding device is set in all networks. In FIG. 16, the system includes a server 81, a gateway (GW) 83, a meter box 85, and meters 86 (86a to 86c). An IP network 82 exists between the server 81 and the gateway 83, and an ad hoc network 84 exists between the gateway 83 and the meter box 85. In this case, in FIG. 16, the server 81 and the gateway 83 are described outside the networks in order to see the server 81 and the gateway 83 clearly, but it is assumed that the server 81 is included in the IP network 82. Further, at least one of the ports of the gateway 83 belongs to the IP network 82, and a different one of the ports of the gateway 83 is included in the ad hoc network 84. Furthermore, communication between the meter box 85 and the meters 86a to 86c is performed using a universal asynchronous receiver transmitter (UART).

Figure 17:
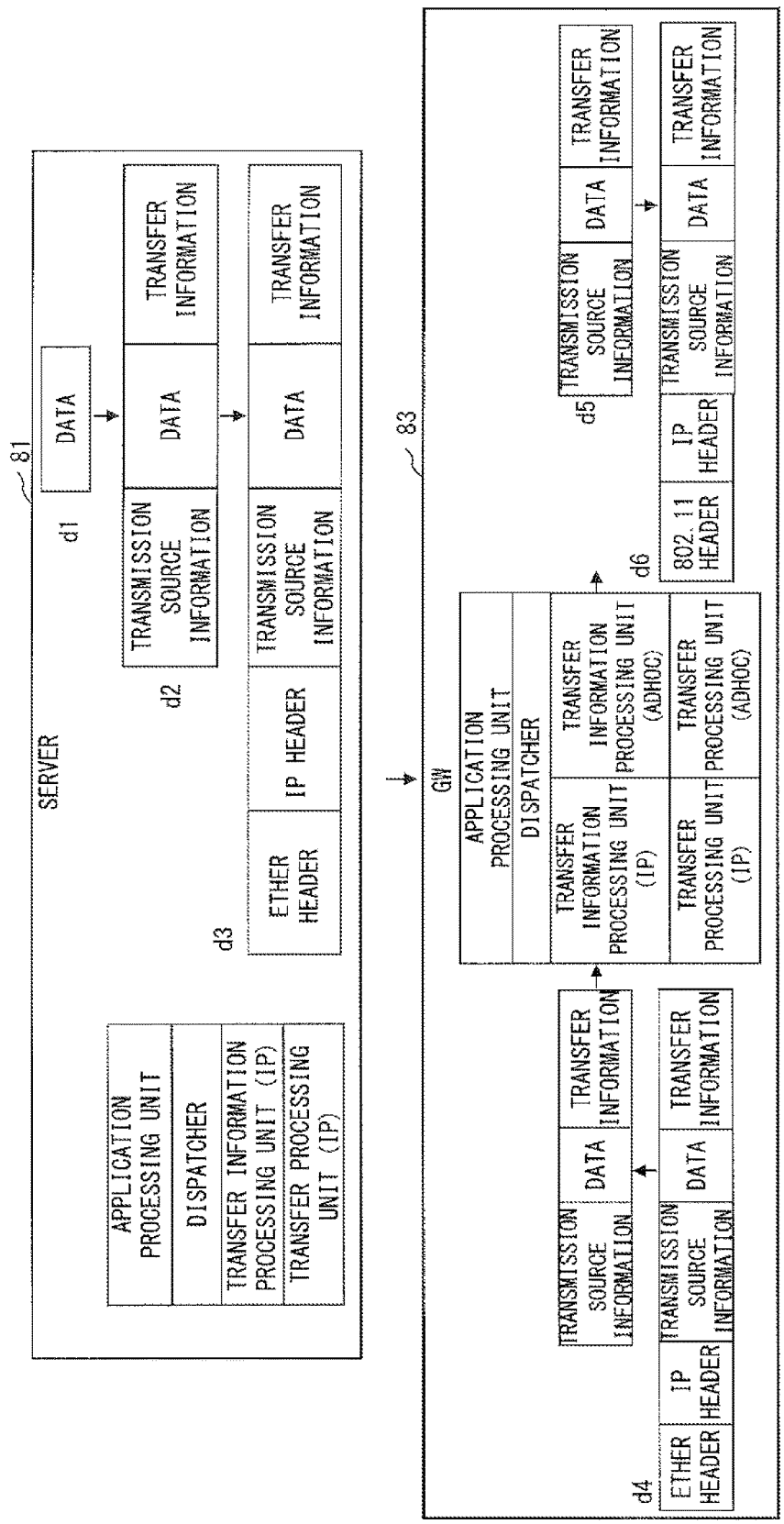
FIG. 17 illustrates an example of converting a packet format.
Figure 18:
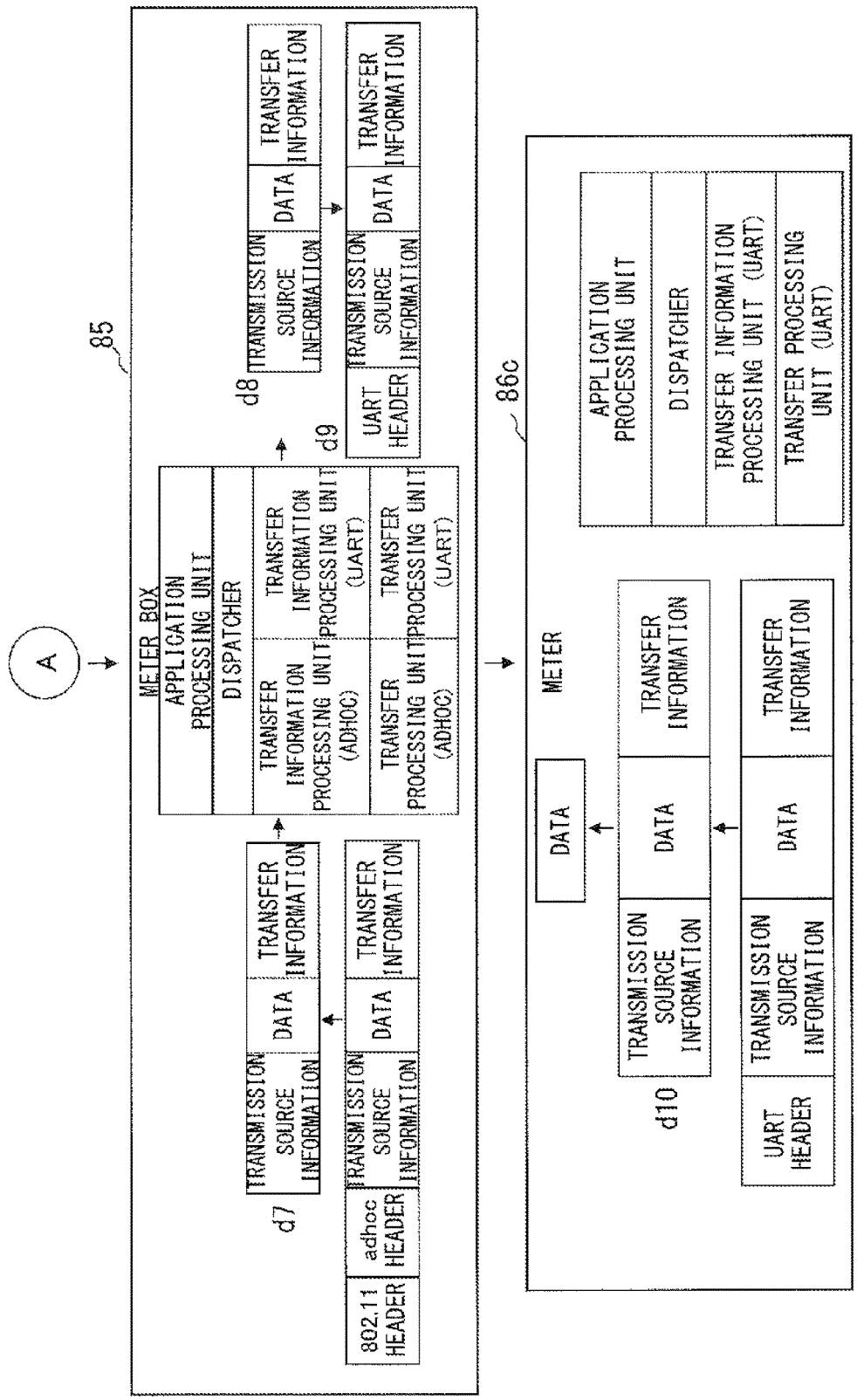
FIG. 18 illustrates an example, of converting a packet format.

FIGS. 17 and 18 illustrate examples of converting a packet format. Referring to FIGS. 17 and 18, an example of converting a packet when the server 81 transmits a packet to the meter 86c using transfer information after the packet is transmitted from the meter 86c to the server 81 is described below.

In Procedure d1, when data destined for the meter 86c is generated, an application processing unit 70_81 of the server 81 generates transmission source information. Further, the application processing unit 70_81 searches for transfer information associated with the meter 86c, and outputs, to a determination unit 52_81, the obtained transfer information along with the generated, data and transmission source information. In the following descriptions, the obtained transfer information includes the following information elements from the head.

Index value of an application of the meter 86c
Device index value of the meter 86c
Index value of a network established between the meter box 85 and the meter 86c using a UART
Device index value of the meter box 85
Network index value of the ad hoc network 84
Device index value of the gateway 83
Network index value of the IP network 82

In Procedure d2, the determination unit 52_81 obtains a network index value situated at the end of the transfer information input from the application processing unit 70_81, so as to determine that the input data is to be transmitted to the IP network 82. The determination unit 52_81 connects the transmission source information, the data, and the transfer information in that order, so as to generate a payload of a transmission packet. In this case, the determination unit 52_81 uses, for the generation of a payload, the transfer information from which the used network index value has been deleted. The determination unit 52_81 outputs the generated payload to a transfer destination determining unit 41_81. The following are transfer information elements, from the head, that are included in the payload obtained by the transfer destination determining unit 41_81.

Index value of an application of the meter 86c
Device index value of the meter 86c
Index value of the network established between the meter box 85 and the meter 86c using a UART
Device index value of the meter box 85
Network index value of the ad hoc network 84
Device index value of the gateway 83

In Procedure d3, the transfer destination determining unit 41_81 determines the gateway 83 to be a destination of the transmission packet because the transfer information has a device index value of the gateway 83 at its end. The transfer destination determining unit 41_81 deletes the device index value of the gateway 83 from the transfer information of the input payload, and then outputs the payload to a transfer processing unit 21_81. In order to transmit the transmission packet to the gateway 83, the transfer processing unit 21_81 adds an ether header and an IP header to the head of the payload, and transmits the transmission packet to the gateway 83 through a transmission/reception unit 11_81.

In Procedure d4, the gateway 83 receives the packet transmitted from the server through a port that is connected to the IP network 82. A packet processing unit 20b_83 used to communicate with the IP network 82 outputs, to a transmission source adding unit 42b_83 used to communicate with the IP network 82, the payload from which the ether header and the IP header have been deleted. When it determines, using communication direction information, that the packet transmitted from the server has been received, the transmission source adding unit 42b_83 outputs the payload to a determination unit 52_83.

In Procedure d5, the following are transfer information elements, from the head, that are included in the payload obtained by the determination unit 52_83.

Index value of an application of the meter 86c
Device: index value of the meter 86c
Index value of the network established between the meter box 85 and the meter 86c using a UART
Device index value of the meter box 85
Network index value of the ad hoc network 84

Then, the determination unit 52_83 outputs the input payload to a transfer destination determining unit 41a_83 used to communicate with the ad hoc network 84 because the transfer information has a network index value of the ad hoc network 84 at its end. At this point, the determination unit 52_83 deletes the network index value of the ad hoc network 84 from the payload, so the following transfer information is output to the transfer destination determining unit 41a_83.

Index value of an application of the meter 86c
Device index value of the meter 86c
Index value of the network established between the meter box 85 and the meter 86c using a UART
Device index value of the meter box 85

The transfer destination determining unit 41a_83 determines the meter box 85 to be a destination of the transmission packet because the transfer information has a device index value of the meter box 85 at its end. The transfer destination determining unit 41a_83 deletes the device index value of the meter box 85 from the transfer information of the input payload, and then outputs the payload to a transfer processing unit 21a_83.

In Procedure d6, in order to transmit the transmission packet to the meter box 85, the transfer processing unit 21a_83 adds an 802.11 header and an ad hoc header to the head of the payload, and transmits the transmission packet to the meter box 85 through a transmission/reception unit 11a_83.

In Procedure d7, the meter box 85 receives the packet through a port that is connected to the ad hoc network 84. A packet processing unit 20b_85 used to communicate with the ad hoc network 84 outputs, to a transmission source adding unit 42b_85 used to communicate with the ad hoc network 84, the payload from which the 802.11 header and the ad hoc header have been deleted. When it determines, using the communication direction information, that the packet transmitted from the server has been received, the transmission source adding unit 42b_85 outputs the payload to a determination unit 52_85. The following are transfer information elements, from the head, that are included in the payload obtained by the determination unit 52_85.

Index value of an application of the meter 86c
Device index value of the meter 86c
Index value of the network established between the meter box 85 and the meter 86c using a UART In Procedure d8, the determination unit 52_85 outputs the input payload to a transfer destination determining unit 41a_85 used to communicate with the meter 86c because the transfer information has, at its end, an index value of the network established between the meter box 85 and the meter 86c using a UART. At this point, the determination unit 52_85 deletes, from the payload, the index value of the network established between the meter box 85 and the meter 86c using a UART, so the following transfer information is output to the transfer destination determining unit 41a_85.

Index value of an application of the meter 86c
Device index value of the meter 86c The transfer destination determining unit 41a_85 determines the meter 86c to be a destination of the transmission packet because the transfer information has a device index value of the meter 86c at its end. The transfer destination determining unit 41a_85 deletes the device index value of the meter 86c from the transfer information of the input payload, and then outputs the payload to a transfer processing unit 21a_85.

In Procedure d9, in order to transmit the transmission packet to the meter 86c, the transfer processing unit 21a_85 adds a UART header to the head of the payload, and transmits the transmission packet to the meter 86c through a transmission/reception unit 11.

In Procedure d10, the meter 86c receives the packet through a port that is connected to the meter box 85. A packet processing unit 20_86c used to communicate with the meter box 85 outputs, to a transmission source adding unit 42_86c used to communicate with the meter box 85, the payload from which the UART header has been deleted. When it determines, using the communication direction information, that the packet transmitted from the server has been received, the transmission source adding unit 42_86c outputs the payload to a determination unit 52_86c. The transfer information element in the payload obtained by the determination unit 52_86c is the index value of the application of the meter 86c. Thus, the determination unit 52_86c deletes the transmission source information and the transfer information from the payload, and outputs the data to an application processing unit 70_86c.

As described above, in one aspect, the communication system according to the embodiment permits a reduction of an amount of data of route information included in a packet.

<Others>

The embodiments are not limited to the embodiment described above, and various modifications may be made thereto. Some other examples will be described below.

A case in which a device that performs relay processing adds a network index value and a device index value to the end of transfer information every time a packet destined for a server is relayed between networks has been described above as an example, but the position to which the network index value and the device index value are added may be the head of the transfer information. In that case, when it is used as route information of a packet transmitted from a server side, a relay device 10 that has a smaller number of hops from a server is more likely to use information situated at the head of a transfer device when performing transfer processing.

In FIG. 3, each routing table 22 that is included in the packet processing unit 20 and used by a corresponding transfer processing unit 21 is described outside the transfer processing unit 21, but the position at which the routing table 22 is held may be changed according to a protocol. For example, depending on a protocol, the routing table 22 may be held inside the transfer processing unit 21. Further, for example, when two types of protocols are used for routing, two types of routing tables 22, that is, a routing table 22 included in the packet processing unit 20 and a routing table 22 that is held inside the transfer processing unit 21, may be used.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication system comprising:
   an information processing device; and
   a relay device that stores information identifying a transfer destination device that is a transfer destination of a packet including data to be processed by the information processing device, and relays communication between a first network including the transfer destination device and a second network, the relay device including a processor and a communication interface, wherein the communication interface receives a first data packet that includes data to be processed by the information processing device from a transmission source in the second network, the processor generates a device index value used when the relay device determines the transmission source from among devices included in the second network, the device index value having a bit length shorter than a bit length of an address of the transmission source, the processor controls the communication interface so as to transmit, to the transfer destination device, a second data packet obtained by adding, to the first data packet, the device index value and a network index value that identifies the second network, the network index value having a bit length shorter than a bit length of an identifier of the second network, and communication direction information is used instead of an address of the information processing device in the first data packet and the second data packet, the communication direction information indicating whether data to be processed by the information processing device is included.

2. The communication system according to claim 1, wherein a first relay device stores a piece of information about the information processing device as the transfer destination device, receives a third data packet from a second relay device, obtains a fourth data packet by adding, to the third data packet, a combination of a second device index value used to determine the second relay device and a second network index value, and transfers the fourth data packet to the information processing device, and wherein the information processing device receives the fourth data packet, and stores a first device index value, a first network index value, and the combination as information about a route from the information processing device to a communication device that generated data in the received fourth data packet, the first device index value being used to identify the first relay device in a network that includes the information processing device, the first network index value identifying the network that includes the information processing device.

3. The communication system according to claim 2, wherein the information processing device determines, using the first device index value and the first network index value, the first relay device to be a transfer destination of a transmission packet including transmission data that is to be transmitted to a communication device that generated data in the fourth data packet, and generates a first transmission packet that includes the transmission data, the second device index value, and the second network index value, and wherein the first relay device receives the first transmission packet, determines a transfer destination network of a second transmission packet using the second network index value, the second transmission packet being obtained by deleting the second device index value and the second network index value from the first transmission packet, determines the second relay device to be a transfer destination of the second transmission packet, using the second device index value, and transmits the second transmission packet to the second relay device.

4. The communication system according to claim 3, wherein when communication between the information processing device and the first relay device is performed using a first protocol and communication between the first relay device and the second relay device is performed using a second protocol, the first transmission packet includes the second device index value, the second network index value, the transmission data, and a first header corresponding to the first protocol, using the second network index value, the first relay device determines to use a second header for transferring the transmission data, the second header corresponding to the second protocol, the first relay device determines, using the second device index value, that a destination included in the second header is the second relay device, and the second transmission packet is transmitted to the second relay device using the second header.

5. The communication system according to claim 2, wherein the first relay device generates the second device index value such that a bit length of the second device index value is shorter than a bit length of an address of the second relay device.

6. A relay device that relays a communication between a plurality of networks, the relay device comprising:

a memory that stores information identifying a transfer destination device that is a transfer destination of a packet including data to be processed by an information processing device, the transfer destination device being included in a first network;

a communication interface that receives a first data packet that includes data to be processed by the information processing device from a transmission source in a second network, the second network being different from the first network; and a processor that generates a device index value used when the relay device determines the transmission source from among devices included in the second network, the device index value having a bit length shorter than a bit length of an address of the transmission source, wherein the processor obtains a second data packet by adding, to the first data packet, the device index value and a network index value that identifies the second network, the network index value having a bit length shorter than a bit length of an identifier of the second network, wherein the processor controls the communication interface so as to transmit a second data packet to the transfer destination device, and wherein communication direction information is used instead of an address of the information processing device in the first data packet and the second data packet, the communication direction information indicating whether data to be processed by the information processing device is included.

7. The relay device according to claim 6, wherein
the communication interface receives a first transmission packet that includes transmission data that is to be transmitted by the information processing device to a communication device that generated data in the first data packet, the device index value, and the network index value, and
the processor
determines the second network to be a network to which a second transmission packet obtained by deleting the device index value and the network index value from the first transmission packet is to be transferred, using the network index value, and
determines the transmission source to be a destination of the second transmission packet, using the device index value.

8. The relay device according to claim 7, wherein
when communication in the first network is performed using a first protocol and communication in the second network is performed using a second protocol, the first transmission packet includes the device index value, the network index value, the transmission data, and a first header corresponding to the first protocol, and
the processor
determines, using the network index value, to use a second header for transferring the transmission data, the second header corresponding to the second protocol, and
determines, using the device index value, that a destination included in the second header is the transmission source.

9. A non-transitory computer-readable recording medium having stored therein a program for causing a relay device that relays a communication between a plurality of networks to execute a process comprising:
receiving, from a transmission source in a second network, a first data packet that includes data to be processed by an information processing device, the second network being different from a first network that includes a transfer destination device that is a transfer destination of a packet including data to be processed by the information processing device;
generating a device index value that is used when the relay device determines the transmission source from among devices included in the second network, the device index value having a bit length shorter than a bit length of an address of the transmission source;
generating a second data packet by adding, to the first data packet, the device index value and a network index value that identifies the second network, the network index value having a bit length shorter than a bit length of an identifier of the second network; and
controlling a transmitter so as to transmit the second data packet, to the transfer destination device,
wherein communication direction information is used instead of an address of the information processing device in the first data packet and the second data packet, the communication direction information indicating whether data to be processed by the information processing device is included.

10. The recording medium according to claim 9, wherein the program causes the relay device to execute the process comprising:
receiving a first transmission packet that includes transmission data that is to be transmitted by the information processing device to a communication device that generated data in the first data packet, the device index value, and the network index value;
determining the second network to be a network to which a second transmission packet obtained by deleting the device index value and the network index value from the first transmission packet is to be transferred, using the network index value; and
determining a transmission destination of the second transmission packet, using the device index value.

11. A communication method executed by a relay device that relays a communication between a plurality of networks, the communication method comprising:
receiving, from a transmission source in a second network, a first data packet that includes data to be processed by an information processing device, the second network being different from a first network that includes a transfer destination device that is a transfer destination of a packet including data to be processed by the information processing device;
generating a device index value that is used when the relay device determines the transmission source from among devices included in the second network, the device index value having a bit length shorter than a bit length of an address of the transmission source;
generating a second data packet by adding, to the first data packet, the device index value and a network index value that identifies the second network, the network index value having a bit length shorter than a bit length of an identifier of the second network; and
controlling a transmitter so as to transmit the second data packet to the transfer destination device,
wherein communication direction information is used instead of an address of the information processing device in the first data packet and the second data packet, the communication direction information indicating whether data to be processed by the information processing device is included.

12. The communication system according to claim 1, wherein
the second data packet excludes the address of the transmission source in routing information.

13. The relay device according to claim 6, wherein
the second data packet excludes the address of the transmission source in routing information.

14. The recording medium according to claim 9, wherein
the second data packet excludes the address of the transmission source in routing information.

15. The communication method according to claim 11, wherein
the second data packet excludes the address of the transmission source in routing information.

* * * * *